US012348842B2

(12) United States Patent
Kiyohara et al.

(10) Patent No.: US 12,348,842 B2
(45) Date of Patent: Jul. 1, 2025

(54) IMAGING SYSTEM AND METHOD EXECUTED BY IMAGING SYSTEM

(71) Applicant: Panasonic Intellectual Property Management Co., Ltd., Osaka (JP)

(72) Inventors: Takayuki Kiyohara, Osaka (JP); Motoki Yako, Osaka (JP); Atsushi Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 177 days.

(21) Appl. No.: 18/357,113

(22) Filed: Jul. 22, 2023

(65) Prior Publication Data

US 2023/0362462 A1    Nov. 9, 2023

Related U.S. Application Data

(63) Continuation of application No. PCT/JP2022/004003, filed on Feb. 2, 2022.

(30) Foreign Application Priority Data

Feb. 19, 2021  (JP) ................................ 2021-025219

(51) Int. Cl.
*H04N 23/10*     (2023.01)
*G01J 3/28*      (2006.01)
*G06T 7/80*      (2017.01)

(52) U.S. Cl.
CPC ............ *H04N 23/10* (2023.01); *G01J 3/2823* (2013.01); *G06T 7/80* (2017.01); *G01J 2003/2826* (2013.01); *G06T 2200/24* (2013.01)

(58) Field of Classification Search
CPC ....... H04N 23/10; H04N 23/12; G01J 3/2823; G01J 2003/2826; G01J 3/12; G01J 2003/1217; G06T 7/80; G06T 2200/24

(Continued)

(56) References Cited

U.S. PATENT DOCUMENTS

2003/0011767 A1   1/2003  Imura et al.
2016/0138975 A1   5/2016  Ando et al.
(Continued)

FOREIGN PATENT DOCUMENTS

JP    2003-090761    3/2003

OTHER PUBLICATIONS

International Search Report of PCT application No. PCT/JP2022/004003 dated Mar. 22, 2022.

*Primary Examiner* — Usman A Khan
(74) *Attorney, Agent, or Firm* — Wenderoth, Lind & Ponack, L.L.P.

(57) ABSTRACT

An imaging system is an imaging system using a compressed sensing technology, and includes a filter array including types of filters different from one another in transmission spectrum, an image sensor that generates image data based on light that passes through the filter array, a processing circuit that generates hyperspectral image data including images corresponding to four or more bands included in a target wavelength region on the basis of the image data and a reconstruction table decided on the basis of a spatial distribution of the transmission spectra of the types of filters, and a light source that emits reference light used for calibration for correcting the reconstruction table and having a wavelength of at least one of the four or more bands, and the processing circuit corrects the reconstruction table on the basis of reference image data which the image sensor generates by detecting the reference light.

17 Claims, 20 Drawing Sheets

(58) Field of Classification Search
USPC .................................................. 348/222.1
See application file for complete search history.

(56) References Cited

U.S. PATENT DOCUMENTS

2017/0332025 A1* 11/2017 Nozawa ................ G01S 17/894
2018/0139365 A1* 5/2018 Kanamori .............. H04N 25/44

* cited by examiner

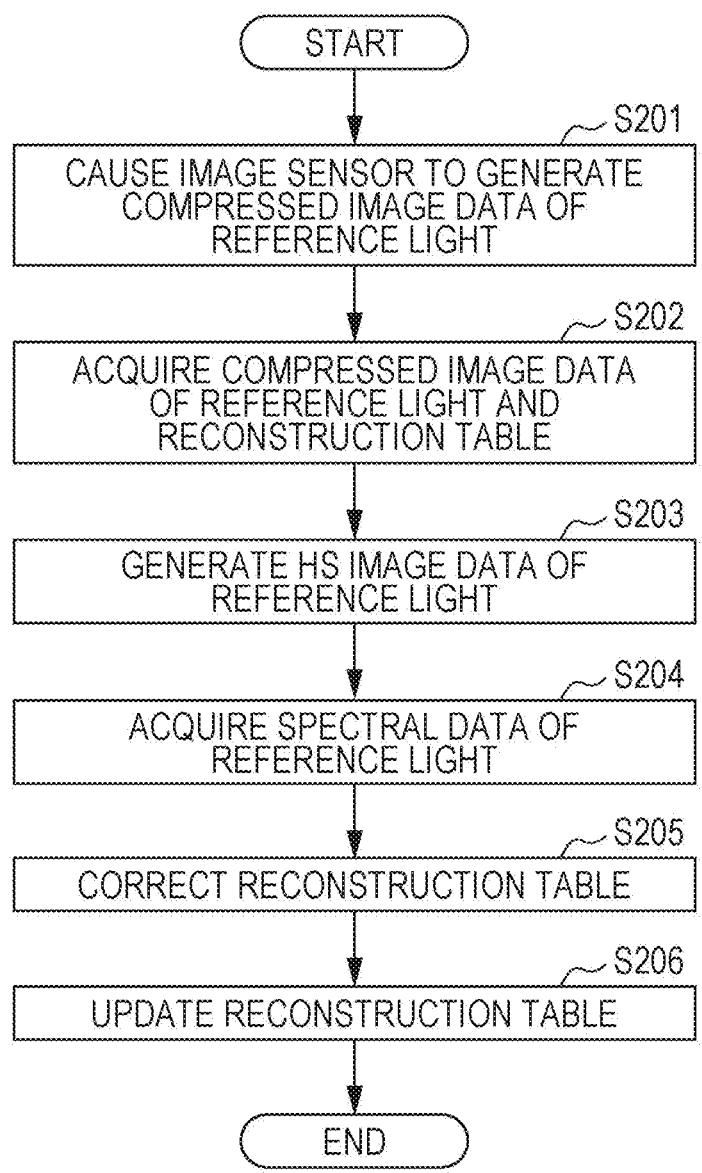

FIG. 7A

| WAVELENGTH | FILTER 1 | FILTER 2 | FILTER 3 | FILTER 4 | FILTER 5 | FILTER 6 | ... |
|---|---|---|---|---|---|---|---|
| BAND 1 | 400-450 | 0.4 | 0.5 | 0.2 | 0.7 | 0.5 | 0.6 | ... |
| BAND 2 | 450-500 | 0.3 | 0.6 | 0.9 | 0.5 | 0.8 | 0.4 | ... |
| BAND 3 | 500-550 | 0.4 | 0.8 | 0.2 | 0.8 | 0.7 | 0.3 | ... |
| BAND 4 | 550-600 | 0.5 | 0.7 | 0.2 | 0.3 | 0.4 | 0.5 | ... |
| ... | ... | ... | ... | ... | ... | ... | ... |

FIG. 7B

| | WAVELENGTH | SPECTRAL INTENSITY |
|---|---|---|
| BAND 1 | 400-450 | 0.8 |
| BAND 2 | 450-500 | 0.7 |
| BAND 3 | 500-550 | 0.9 |
| BAND 4 | 550-600 | 0.8 |
| ... | | ... |

FIG. 7C

| | WAVELENGTH | FILTER 1 | FILTER 2 | FILTER 3 | FILTER 4 | FILTER 5 | FILTER 6 | ... |
|---|---|---|---|---|---|---|---|---|
| BAND 1 | 400-450 | 0.99 | 1.1 | 1 | 0.98 | 1.03 | 0.95 | ... |
| BAND 2 | 450-500 | 1.02 | 1.07 | 1.04 | 0.94 | 0.88 | 1 | ... |
| BAND 3 | 500-550 | 0.93 | 0.99 | 1.05 | 0.84 | 1 | 1.02 | ... |
| BAND 4 | 550-600 | 0.97 | 0.94 | 1.02 | 1.08 | 1.04 | 0.99 | ... |
| ... | ... | ... | ... | ... | ... | ... | ... | |

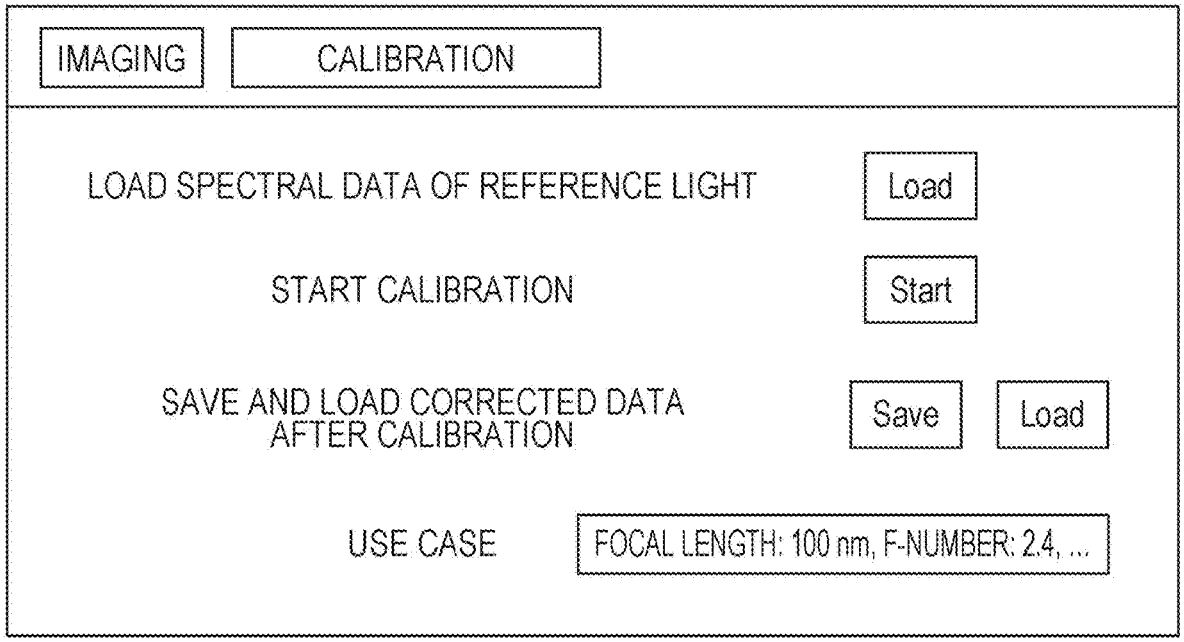

FIG. 13A $$g3 = \begin{pmatrix} g3(1,1) \\ g3(1,2) \\ g3(1,3) \\ g3(2,1) \\ g3(2,2) \\ g3(2,3) \end{pmatrix}$$

| g3(1,1) | g3(1,2) | g3(1,3) |
|---------|---------|---------|
| g3(2,1) | g3(2,2) | g3(2,3) |

THIRD IMAGE

FIG. 13B $$f41 = \begin{pmatrix} f41(1,1) \\ f41(1,2) \\ f41(1,3) \\ f41(2,1) \\ f41(2,2) \\ f41(2,3) \end{pmatrix} = \begin{pmatrix} P \\ P \\ P \\ P \\ P \\ P \end{pmatrix}$$

| f41(1,1) | f41(1,2) | f41(1,3) |
|----------|----------|----------|
| f41(2,1) | f41(2,2) | f41(2,3) |

IMAGE Im41

FIG. 13C $$f42 = \begin{pmatrix} f42(1,1) \\ f42(1,2) \\ f42(1,3) \\ f42(2,1) \\ f42(2,2) \\ f42(2,3) \end{pmatrix} = \begin{pmatrix} 0 \\ 0 \\ 0 \\ 0 \\ 0 \\ 0 \end{pmatrix}$$

| f42(1,1) | f42(1,2) | f42(1,3) |
|----------|----------|----------|
| f42(2,1) | f42(2,2) | f42(2,3) |

IMAGE Im42

FIG. 13D

```
  →X
Y | f43(1,1) | f43(1,2) | f43(1,3) |
  | f43(2,1) | f43(2,2) | f43(2,3) |
     IMAGE Im43
```

$$f43 = \begin{pmatrix} f43(1,1) \\ f43(1,2) \\ f43(1,3) \\ f43(2,1) \\ f43(2,2) \\ f43(2,3) \end{pmatrix} = \begin{pmatrix} 0 \\ 0 \\ 0 \\ 0 \\ 0 \\ 0 \end{pmatrix}$$

FIG. 13E

```
  →X
Y | f44(1,1) | f44(1,2) | f44(1,3) |
  | f44(2,1) | f44(2,2) | f44(2,3) |
     IMAGE Im44
```

$$f44 = \begin{pmatrix} f44(1,1) \\ f44(1,2) \\ f44(1,3) \\ f44(2,1) \\ f44(2,2) \\ f44(2,3) \end{pmatrix} = \begin{pmatrix} 0 \\ 0 \\ 0 \\ 0 \\ 0 \\ 0 \end{pmatrix}$$

IMAGING SYSTEM AND METHOD EXECUTED BY IMAGING SYSTEM

BACKGROUND

1. Technical Field

The present disclosure relates to an imaging system and a method executed by the imaging system.

2. Description of the Related Art

A hyperspectral camera can obtain a larger number of pieces of wavelength information concerning a target than a general RGB camera. Spectral characteristics of the target can be accurately analyzed on the basis of a hyperspectral image of the target taken by the hyperspectral camera. It is expected that the hyperspectral camera is used for various applications such as analysis, research, and inspection of a product. Hyperspectral cameras are classified into ones using a spectroscopic element such as a prism or a grating and ones using a compressed sensing technology disclosed in U.S. Pat. No. 9,599,511 (hereinafter referred to as Patent Literature 1).

For example, if a hyperspectral camera deteriorates over time, accuracy of wavelength information obtained from a hyperspectral image may undesirably decrease. In this case, calibration of the hyperspectral camera is performed. Japanese Unexamined Patent Application Publication No. 2003-90761 (hereinafter referred to as Patent Literature 2) discloses an example of calibration using a spectroscopic element.

SUMMARY

One non-limiting and exemplary embodiment provides an imaging system that makes it easy to perform calibration of an imaging device using a compressed sensing technology.

In one general aspect, the techniques disclosed here feature an imaging system using a compressed sensing technology, including a filter array including types of filters that are different from one another in transmission spectrum; an image sensor that generates image data on the basis of light that passes through the filter array; a processing circuit that generates hyperspectral image data including images corresponding to four or more bands included in a target wavelength region on the basis of the image data and a reconstruction table decided on the basis of a spatial distribution of the transmission spectra of the types of filters; and a light source that emits reference light used for calibration for correcting the reconstruction table and having a wavelength of at least one of the four or more bands, in which the processing circuit corrects the reconstruction table on the basis of reference image data which the image sensor generates by detecting the reference light.

According to the technique of the present disclosure, it is possible to provide an imaging system that makes it easy to perform calibration of an imaging device using a compressed sensing technology.

It should be noted that general or specific embodiments of the present disclosure may be implemented as a system, an apparatus, a method, an integrated circuit, a computer program, a computer-readable storage medium, or any selective combination thereof. Examples of the computer-readable storage medium include a non-volatile storage medium such as a compact disc-read only memory (CD-ROM). The apparatus may include one or more apparatuses. In a case where the apparatus includes two or more apparatuses, the two or more apparatuses may be disposed in one piece of equipment or may be separately disposed in two or more separate pieces of equipment. In the specification and claims, the "apparatus" can mean not only a single apparatus, but also a system including apparatuses. The apparatuses included in the "system" can include an apparatus that is installed in a place remote from other apparatuses and is connected to the other apparatuses over a communication network.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a flowchart illustrating an example of calibration operation for correcting a reconstruction table;

FIG. 7A illustrates a first example of data stored in a storage device;

FIG. 7B illustrates a second example of data stored in the storage device;

FIG. 7C illustrates a third example of data stored in the storage device;

FIG. 8A schematically illustrates a first example of a GUI displayed on a display device;

FIG. 8B schematically illustrates a second example of a GUI displayed on the display device;

FIG. 13A illustrates a third image and image data expressed in a matrix form;

FIG. 13B illustrates an image and image data expressed in a matrix form;

FIG. 13C illustrates an image and image data expressed in a matrix form;

FIG. 13D illustrates an image and image data expressed in a matrix form;

FIG. 13E illustrates an image and image data expressed in a matrix form;

DETAILED DESCRIPTIONS

Figure 1A:
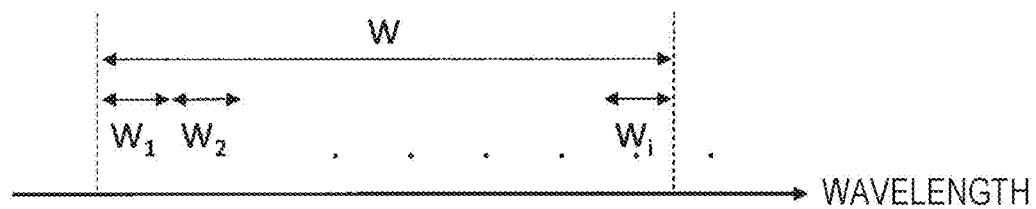
FIG. 1A is a view for explaining a relationship between a target wavelength region and bands included in the target wavelength region.

In the present disclosure, all or a part of any of circuit, unit, device, part or portion, or any of functional blocks in the block diagrams may be implemented as one or more of electronic circuits including, but not limited to, a semiconductor device, a semiconductor integrated circuit (IC) or a large scale integration (LSI). The LSI or IC can be integrated into one chip, or also can be a combination of plural chips. For example, functional blocks other than a memory may be integrated into one chip. The name used here is LSI or IC, but it may also be called system LSI, very large scale integration (VLSI), or ultra large scale integration (ULSI) depending on the degree of integration. A Field Programmable Gate Array (FPGA) that can be programmed after manufacturing an LSI or a reconfigurable logic device that allows reconfiguration of the connection or setup of circuit cells inside the LSI can be used for the same purpose.

Further, it is also possible that all or a part of the functions or operations of the circuit, unit, device, part or portion are implemented by executing software. In such a case, the software is recorded on one or more non-transitory recording media such as a ROM, an optical disk or a hard disk drive, and when the software is executed by a processor, the software causes the processor together with peripheral devices to execute the functions specified in the software. A system or apparatus may include such one or more non-transitory recording media on which the software is recorded and a processor together with necessary hardware devices such as an interface.

An exemplary embodiment of the present disclosure is described below. The embodiment described below illustrates a general or specific example. Numerical values, shapes, constituent elements, the way in which the constituent elements are disposed and connected, steps, the order of steps, and the like illustrated in the embodiment below are examples and do not limit the present disclosure. Among constituent elements in the embodiment below, constituent elements that are not described in independent claims indicating highest concepts are described as optional constituent elements. The drawings are schematic views and are not necessarily strict illustration. Furthermore, in the drawings, substantially identical constituent elements are given identical reference signs, and repeated description is sometimes omitted or simplified.

Underlying knowledge forming basis of the present disclosure is described before the embodiment of the present disclosure is described.

First, an example of a hyperspectral image is briefly described with reference to FIGS. 1A and 1B. The hyperspectral image is image data having a larger number of pieces of wavelength information than a general RGB image. The RGB image has, for each pixel, values concerning three bands of red (R), green (G), and blue (B). On the other hand, the hyperspectral image has, for each pixel, values concerning a larger number of bands than the RGB image. The "hyperspectral image" as used herein refers to image data including images corresponding to four or more bands included in a predetermined target wavelength region. Hereinafter, a value which each pixel has for each band is referred to as a "pixel value". The number of bands in a hyperspectral image is typically 10 or more, and is larger than 100 in some cases. The "hyperspectral image" is sometimes called a "hyperspectral data cube" or a hyperspectral cube".

FIG. 1A is a view for explaining a relationship between a target wavelength region W and bands $W_1, W_2, \ldots,$ and $W_i$ included in the target wavelength region W. The target wavelength region W can be set to any of various ranges depending on intended use. The target wavelength region W can be, for example, a wavelength region of visible light of approximately 400 nm to approximately 700 nm, a wavelength region of near-infrared light of approximately 700 nm to approximately 2500 nm, or a wavelength region of near-ultraviolet light of approximately 10 nm to approximately 400 nm. Alternatively, the target wavelength region W may be a mid-infrared or far-infrared wavelength region. As described above, a wavelength region used is not limited to a visible light region. Hereinafter, not only visible light, but also electromagnetic waves of wavelengths that are not included in a wavelength region of visible light, such as ultraviolet light and near-infrared light are also referred to as "light" for convenience of description.

In the example illustrated in FIG. 1A, the target wavelength region W is equally divided into i wavelength regions where i is any integer of 4 or more, and these wavelength regions are referred to as bands $W_1, W_2, \ldots,$ and $W_i$. Note, however, that such an example is not restrictive. The bands included in the target wavelength region W may be set in any way. For example, the bands may have different widths. There may be gap between adjacent bands. In a case where the number of bands is 4 or more, a larger number of pieces of information can be obtained from a hyperspectral image than from a RGB image.

Figure 1B:
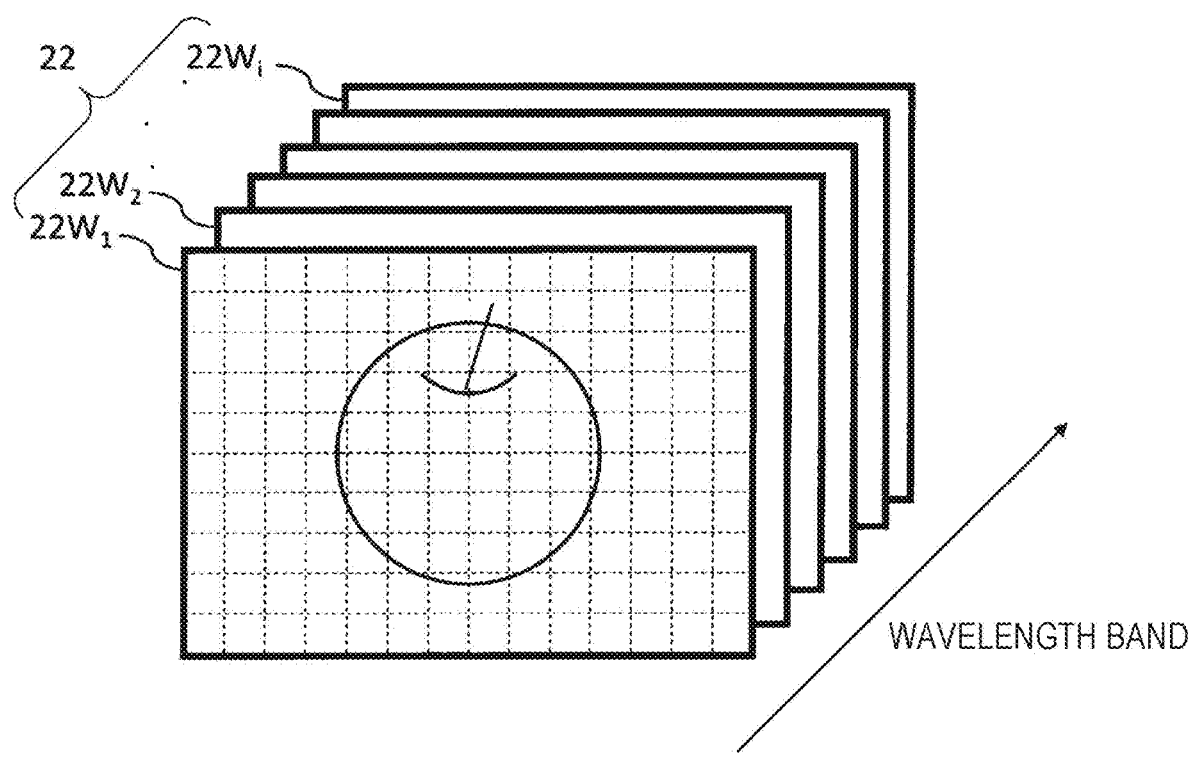
FIG. 1B schematically illustrates an example of a hyperspectral image.

FIG. 1B schematically illustrates an example of a hyperspectral image 22. In the example illustrated in FIG. 1B, an apple is an imaging target. The hyperspectral image 22 includes an image $22W_1$ concerning the band $W_1$, an image $22W_2$ concerning the band $W_2, \ldots,$ and an image $22W_i$ concerning the band $W_i$. Each of these images includes pixels that are two-dimensionally arranged. FIG. 1B illustrates longitudinal and lateral broken lines each indicating a boundary between pixels. Although the actual number of pixels per image can be a large value such as several tens of thousands to several tens of millions of pixels, the boundaries between pixels are illustrated in FIG. 1B assuming that the number of pixels is extremely small for easier understanding. Reflected light generated when a target is irradiated with light is detected by each photodetection element of an image sensor. A signal indicative of an amount of light detected by each photodetection element is a pixel value of a pixel corresponding to the photodetection element. Each pixel of the hyperspectral image 22 has a pixel value for each band. Therefore, information on a two-dimensional distribution of a spectrum of the target can be obtained by acquiring the hyperspectral image 22. Optical properties of the target can be accurately analyzed on the basis of the spectrum of the target.

Hyperspectral image data may be pixel values of pixels included in the image $22W_1$, pixel values of pixels included in the image $22W_2$, ..., and pixel values of pixels included in the image $22W_i$ or may be information indicative of reflectance of the subject obtained by standardizing the pixel values.

Next, an example of a method for generating a hyperspectral image is briefly described. A hyperspectral image can be, for example, acquired by using a spectroscopic element such as a prism or a grating. In a case where a prism is used, when light reflected by a target or light that has passed through the target passes through the prism, the light is emitted from an emission surface of the prism at an emission angle according to a wavelength. In a case where a grating is used, when light reflected by a target or light that has passed through the target enters the grating, the light is diffracted at a diffraction angle according to a wavelength. A hyperspectral image can be obtained by dispersing the light from the target into bands by the prism or grating and detecting the light of each band.

A hyperspectral image can also be acquired by using a compressed sensing technology disclosed in Patent Literature 1. In the compressed sensing technology disclosed in Patent Literature 1, light reflected by a target is detected by an image sensor after passing through a filter array called an encoder or a coded mask. The filter array includes filters that are two-dimensionally arranged. Each of these filters has a unique transmission spectrum. By imaging using such a filter array, a compressed image in which pieces of image information of bands are compressed as a single two-dimensional image. In the compressed image, spectral information of the target is compressed and recorded as a single pixel value for each pixel. In other words, each of pixels included in the compressed image includes pieces of information corresponding to the bands.

Figure 2A:
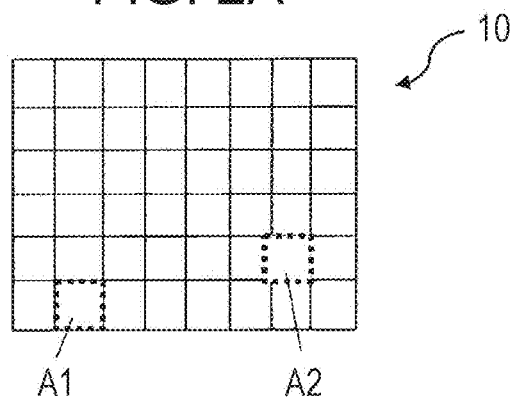
FIG. 2A schematically illustrates an example of a filter array.

FIG. 2A schematically illustrates an example of a filter array 10. The filter array 10 includes filters that are two-dimensionally arranged. Each of the filters has a transmission spectrum that is individually set. The transmission spectrum is expressed by a function $T(\lambda)$ where $\lambda$ is a wavelength of incident light. The transmission spectrum $T(\lambda)$ can take a value equal to or larger than 0 and equal to or smaller than 1. In the example illustrated in FIG. 2A, the filter array 10 includes 48 rectangular filters arranged in six rows and eight columns. This is merely an example, and a larger number of filters can be provided in actual use. The number of filters included in the filter array 10 may be similar to the number of pixels of an image sensor.

Figure 2B:
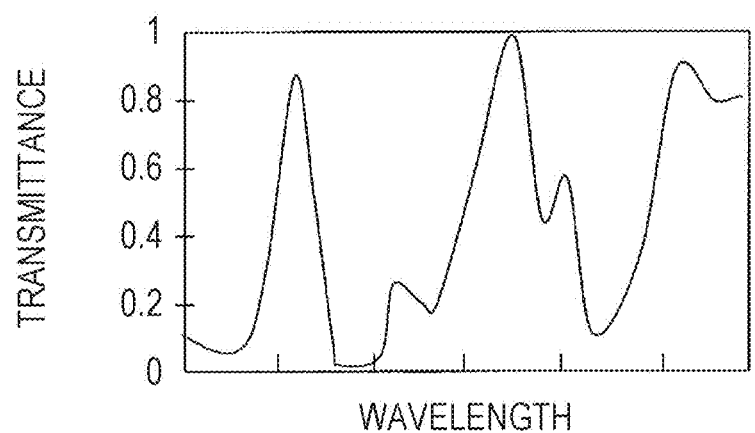
FIG. 2B illustrates an example of a transmission spectrum of a first filter included in the filter array illustrated in FIG. 2A.
Figure 2C:
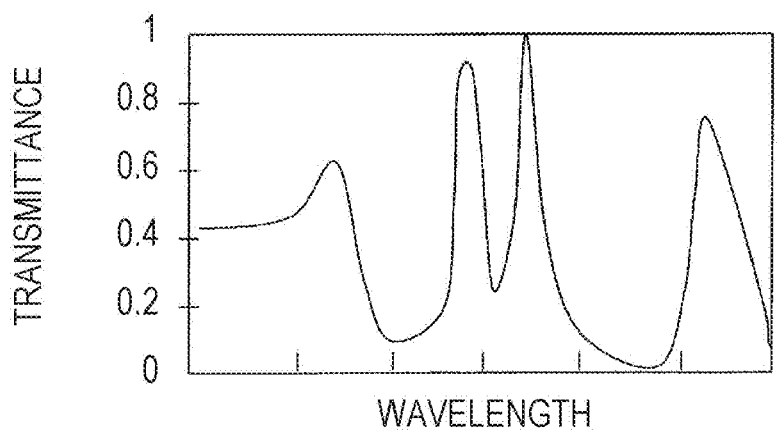
FIG. 2C illustrates an example of a transmission spectrum of a second filter included in the filter array illustrated in FIG. 2A.

FIGS. 2B and 2C illustrate an example of a transmission spectrum of a first filter A1 and an example of a transmission spectrum of a second filter A2, respectively among the filters included in the filter array 10 of FIG. 2A. The transmission spectrum of the first filter A1 and the transmission spectrum of the second filter A2 are different from each other. As just described, the transmission spectrum of the filter array 10 varies from one filter to another. Note, however, that not all filters need to be different in transmission spectrum. At least two of the filters in the filter array 10 are different in transmission spectrum. That is, the filter array 10 includes types of filters that are different in transmission spectrum. In one example, the number of transmission spectrum patterns of the types of filters included in the filter array 10 can be equal to or larger than the number i of bands included in a target wavelength region. The filter array 10 may be designed so that half of the filters or more are different in transmission spectrum.

Figure 2D:
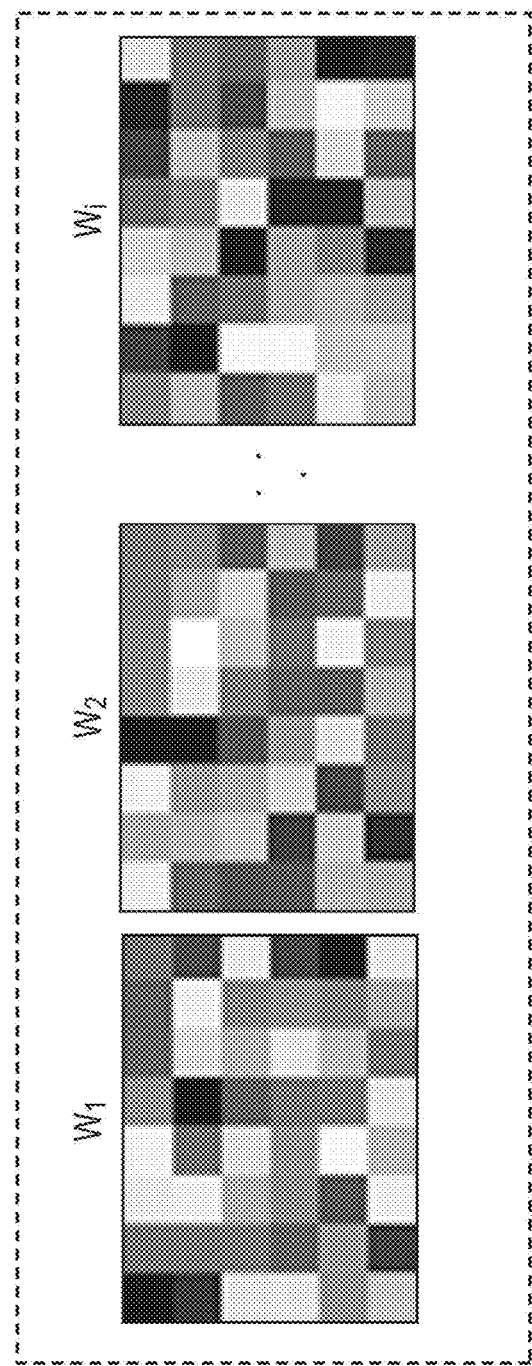
FIG. 2D illustrates an example of a spatial distribution of transmittance of light of each of bands $W_1$, $W_2$, ..., and $W_i$ included in the target wavelength region.

FIG. 2D illustrates an example of a spatial distribution of transmittance of light in each of the bands $W_1, W_2, \ldots,$ and $W_i$ included in the target wavelength region. In the example illustrated in FIG. 2D, differences in density among the filters represent differences in light transmittance. A paler filter has higher transmittance, and a deeper filter has lower transmittance. As illustrated in FIG. 2D, the spatial distribution of light transmittance varies depending on a band. Hereinafter, data indicative of a spatial distribution of light transmittance of each band of a filter array is referred to as a "reconstruction table". A hyperspectral image can be generated from a compressed image by using a reconstruction table by the compressed sensing technology. Since a prism and a grating are not needed in the compressed sensing technology, a size of a hyperspectral camera can be reduced. Furthermore, according to the compressed sensing technology, pieces of spectral information are compressed as a single compressed image, and therefore an amount of data processed by a processing circuit can be reduced. Details of a method for obtaining a hyperspectral image by the compressed sensing technology are disclosed in Patent Literature 1.

A reconstruction table corresponding to the filter array 10 is defined as a matrix by calibration before imaging. A degree of accuracy of the reconstruction table greatly influences accuracy of an actual generated image. It is therefore required to accurately perform calibration of the reconstruction table. Therefore, a hyperspectral camera is shipped after an accurate reconstruction table is generated by performing precise calibration in a production stage. The reconstruction table can be, for example, acquired as follows by using a wavelength-variable laser light source and an integrating sphere in a strictly temperature-controlled optical chamber. The wavelength-variable laser light source emits light of a wavelength corresponding to any one of bands included in a target wavelength region. The light emitted from the wavelength-variable laser light source is input to the integrating sphere and is thereby diffusely reflected, and as a result, planarly-uniform light is generated. The planarly-uniform light is detected by an image sensor after passing through the filter array 10. The above operation is performed for all of the bands included in the target wavelength region, and thereby a reconstruction table is generated. In a case where the target wavelength region includes ten bands, light detection is performed ten times in calibration of the reconstruction table.

Even in a case where a highly accurate reconstruction table is generated in a production stage, an error may occur between the reconstruction table and transmission characteristics of an optical element such as a filter array, for example, due to aging degradation or lens replacement after shipment. This undesirably decreases accuracy of reconstruction of a hyperspectral image. The error of the reconstruction table is defined by how much elements of a matrix constituting the reconstruction table acquired in the production stage differ from actual light transmittance of the filter array 10. In a case where an error occurs in the reconstruction table, a user usually sends a hyperspectral camera back to a manufacturer. The manufacturer performs the calibration again, and thereby a reconstruction table is newly created. Sending a hyperspectral camera back to a manufacturer every time an error occurs in a reconstruction table has problems in terms of time and cost. If a user can correct a reconstruction table in any place of imaging without sending a hyperspectral camera back to a manufacturer, the hyperspectral camera can be used stably for a long term. Therefore, there are demands for an imaging system that allows a user to easily perform calibration of a reconstruction table in a current place.

Patent Literature 2 discloses a method for performing calibration of a spectral device in a place of work. In this calibration, an error of a wavelength of a spectroscopic profile obtained by a spectral device is corrected. A system used for the calibration in the method of Patent Literature 2 includes an integrating sphere, a white board, and a grating in addition to a xenon lamp and a sensor array. The integrating sphere diffusely reflects light emitted from the xenon lamp and thereby makes the light uniform. The white board is attached at an aperture of the integrating sphere and reflects the light that has been made uniform in the integrating sphere. The grating disperses the light reflected by the white board into bands and then causes the light to be incident on pixels of the sensor array. A spectroscopic profile is obtained from an intensity of light of each band incident on the pixels of the sensor array. By comparing the spectroscopic profile thus obtained with a reference spectroscopic profile stored in advance, an error of a wavelength of the spectroscopic profile obtained by the spectral device is corrected. This system is not for correcting an error of a reconstruction table used in the compressed sensing technology. This system includes an integrating sphere and a grating and is therefore large in size.

As a result of the study described above, the inventors of the present invention arrived at an imaging system according to an embodiment of the present disclosure that makes it easy to perform calibration of a reconstruction table. The imaging system according to the embodiment of the present disclosure includes an imaging device using a compressed sensing technology and a light source that emits reference light used for calibration for correcting a reconstruction table. The imaging system according to the present embodiment need not include a grating for dispersing light into bands and an integrating sphere that diffusely reflects light and makes the light uniform, and is therefore small in size and inexpensive. Furthermore, the imaging system according to the present embodiment does not need strict temperature management. Therefore, according to the imaging system according to the present embodiment, a user can easily perform calibration for correcting a reconstruction table under an actual use environment. An imaging system according to the embodiment of the present disclosure and a method executed by the imaging system are described below.

An imaging system according to a first aspect is an imaging system using a compressed sensing technology, and includes a filter array including types of filters that are different from one another in transmission spectrum; an image sensor that generates image data on the basis of light that passes through the filter array; a processing circuit that generates hyperspectral image data including images corresponding to four or more bands included in a target wavelength region on the basis of the image data and a reconstruction table decided on the basis of a spatial distribution of the transmission spectra of the types of filters; and a light source that emits reference light used for calibration for correcting the reconstruction table and having a wavelength of at least one of the four or more bands The processing circuit corrects the reconstruction table on the basis of reference image data which the image sensor generates by detecting the reference light.

According to the imaging system, it is easy to perform calibration of an imaging device using a compressed sensing technology.

In the imaging system according to the first aspect, an imaging system according to a second aspect further includes a storage device in which spectral data of the reference light is stored. The processing circuit generates reference reconstructed image data on the basis of the reconstruction table and the reference image data and corrects the reconstruction table on the basis of the spectral data stored in the storage device and the reference reconstructed image data.

According to the imaging system, it is possible to easily correct the reconstruction table on the basis of the spectral data of the reference light and the reference reconstructed image data.

In the imaging system according to the second aspect, an imaging system according to a third aspect is configured such that the processing circuit causes the corrected reconstruction table to be stored in the storage device.

According to the imaging system, hyperspectral image data of a target can be more accurately generated on the basis of the stored corrected reconstruction table.

In the imaging system according to any one of the first to third aspects, an imaging system according to a fourth aspect is configured such that the processing circuit causes information concerning a status of use of the imaging system before the correction to be stored in the storage device in association with the corrected reconstruction table.

According to the imaging system, the corrected reconstruction table with which the information is associated can be used as a use case.

In the imaging system according to any one of the first to fourth aspects, an imaging system according to a fifth aspect is configured such that the reference light has wavelengths of at least two of the four or more bands.

According to the imaging system, an error of the reconstruction table can be corrected for at least two bands included in the target wavelength region.

In the imaging system according to any one of the first to fifth aspects, an imaging system according to a sixth aspect is configured such that the reference light has wavelengths of all of the four or more bands.

According to the imaging system, an error of the reconstruction table can be corrected for all bands included in the target wavelength region.

In the imaging system according to the fifth or sixth aspect, an imaging system according to a seventh aspect is configured such that the reference image data includes data of pixels; and the data of each of the pixels includes information corresponding to the wavelengths of the two or more bands of the reference light.

According to the imaging system, the reference image data is compressed image data.

In the imaging system according to any one of the first to seventh aspects, an imaging system according to an eighth aspect is configured such that in the calibration, the image sensor generates the reference image data by detecting the reference light a smaller number of times than the number of bands included in the target wavelength region.

According to the imaging system, the reference light is detected a smaller number of times than the number of bands included in the target wavelength region, and it is therefore possible to efficiently generate reference image data.

In the imaging system according to any one of the first to eighth aspects, an imaging system according to a ninth aspect is configured such that the light source is a surface light source having a light emission surface; and the image sensor generates the reference image data by imaging the light emission surface through the filter array.

According to the imaging system, a light detection surface of the image sensor can be uniformly irradiated with the reference light.

In the imaging system according to any one of the first to ninth aspects, an imaging system according to a tenth aspect is configured such that the processing circuit causes a GUI by which a user gives an instruction to start the calibration to be displayed on a display device.

According to the imaging system, calibration can be started by a user's instruction given by using a GUI.

In the imaging system according to the tenth aspect, an imaging system according to an eleventh aspect is configured such that the processing circuit causes a GUI for input of information concerning a status of use of the imaging system before the calibration to be displayed on the display device.

According to the imaging system, correction data identical or similar in terms of a status of use among past correction data can be loaded by inputting the information.

In the imaging system according to any one of the first to eleventh aspects, an imaging system according to a twelfth aspect is configured such that the image sensor detects the reference light emitted from the light source toward a reference object and reflected by the reference object and thereby generates the reference image data.

According to the imaging system, the reference image data can be generated by detecting the reference light travelling via the reference object.

In the imaging system according to any one of the first to twelfth aspects, an imaging system according to a thirteenth aspect is configured such that the correction of the reconstruction table includes correcting an error of an element corresponding to the transmission spectrum that is included in the reconstruction table.

According to the imaging system, an error of an element corresponding to the transmission spectrum that is included in the reconstruction table can be corrected.

An imaging system according to a fourteenth aspect is an imaging system using a compressed sensing technology, and includes a filter array including types of filters that are different from one another in transmission spectrum; an image sensor that generates image data by imaging through the filter array; a processing circuit that generates hyperspectral image data including images corresponding to four or more bands included in a target wavelength region on the basis of the image data and a reconstruction table decided on the basis of a spatial distribution of the transmission spectra of the types of filters; and a storage device in which spectral data concerning a reference object is stored. The processing circuit corrects the reconstruction table on the basis of reference image data generated by imaging the reference object whose spectral data is stored in the storage device.

According to the imaging system, the reconstruction table can be corrected on the basis of reference data generated by detecting light generated by reflection of environment light on the reference object.

A method according to a fifteenth aspect is a method for processing data related to a compressed sensing technology that is executed by a computer. The method includes acquiring reference image data generated by detecting reference light having a wavelength of at least one of four or more bands included in a target wavelength region by an image sensor that generates image data on the basis of light that passes through a filter array including types of filters that are different from one another in transmission spectrum; acquiring a reconstruction table decided on the basis of a spatial distribution of the transmission spectra of the types of filters; and correcting the reconstruction table on the basis of the reference image data.

According to the method, it is easy to perform calibration of an imaging device using a compressed sensing technology.

In the method according to the fifteenth aspect, a method according to a sixteenth aspect further includes acquiring spectral data of the reference light; generating reference reconstructed image data on the basis of the reconstruction table and the reference image data; and correcting the reconstruction table on the basis of the spectral data and the reference reconstructed image data.

According to the method, the reconstruction table can be easily corrected on the basis of the spectral data of the reference light and the reference reconstructed image data.

In the method according to the sixteenth aspect, a method according to a seventeenth aspect further includes causing the corrected reconstruction table to be stored in the storage device.

According to the method, hyperspectral image data of a target can be more accurately generated on the basis of the stored corrected reconstruction table.

Embodiment

Configuration of Imaging System

Figure 3:
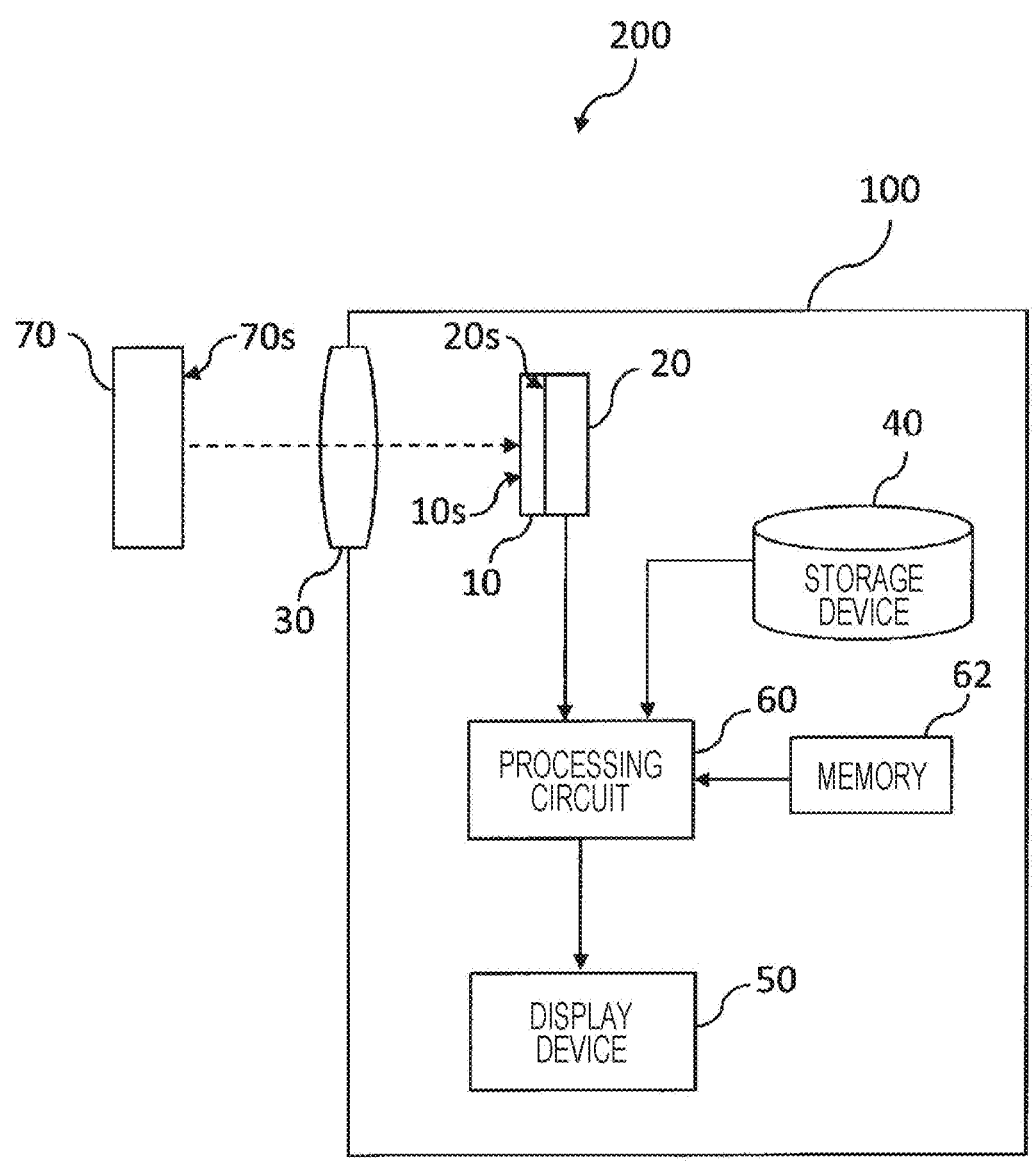
FIG. 3 is a block diagram schematically illustrating a configuration of an imaging system according to an exemplary embodiment of the present disclosure.

First, a configuration of an imaging system according to an exemplary embodiment of the present disclosure is described with reference to FIG. 3. The imaging system according to the present embodiment is used for calibration of an imaging device that images a target by using a compressed sensing technology. In the calibration, a reconstruction table corresponding to a filter array included in the imaging device is corrected. FIG. 3 is a block diagram schematically illustrating a configuration of the imaging system according to the exemplary embodiment of the present disclosure. An imaging system 200 illustrated in FIG. 3 includes an imaging device 100 and a light source 70. The imaging device 100 includes a filter array 10, an image sensor 20, an optical system 30, a storage device 40, a display device 50, a processing circuit 60, and a memory 62. The imaging device 100 functions as a hyperspectral camera. The imaging device 100 illustrated in FIG. 3 may be, for example, a part of a configuration of a mobile terminal or a personal computer.

The filter array 10 has a light incidence surface 10s. The filter array 10 modulates, for each filter, an intensity of light incident on the light incidence surface 10s and emits the modulated light. Details of the filter array 10 have been already described above.

The image sensor 20 has a light detection surface 20s, and includes photodetection elements that are two-dimensionally arranged along the light detection surface 20s. A size of the light detection surface 20s of the image sensor 20 is almost similar to a size of the light incidence surface 10s of the filter array 10. The image sensor 20 is disposed at a position where the image sensor 20 receives light that has passed through the filter array 10. The photodetection elements included in the image sensor 20 correspond to filters included in the filter array 10. The image sensor 20 generates image data based on light that has passed through the filter array 10. The image sensor 20 can be, for example, a charge-coupled device (CCD) sensor, a complementary metal oxide semiconductor (CMOS) sensor, or an infrared array sensor. The photodetection elements can include, for example, a photodiode. The image sensor 20 can be, for example, a monochromatic-type sensor or a color-type sensor.

The optical system 30 is located between the filter array 10 and the light source 70. The filter array 10 and the light source 70 are located on an optical axis of the optical system 30. The optical system 30 includes at least one lens. Although the optical system 30 includes a single lens in the example illustrated in FIG. 3, the optical system 30 may include a combination of lenses. The optical system 30 forms an image on the light detection surface 20s of the image sensor 20 beyond the filter array 10.

The storage device 40 stores therein a reconstruction table corresponding to transmission characteristics of the filter array 10. In a case where a user has not performed calibration yet, the reconstruction table is a table created by a manufacturer. The storage device 40 may further store therein past correction data concerning the reconstruction table, as described later. The storage device 40 may further store therein spectral data of reference light emitted from the light source 70, as described later.

The display device 50 displays a graphic user interface (GUI) that allows a user to give an instruction to start imaging of a target and a GUI that allows the user to give an instruction to start calibration. The display device 50 may be, for example, a display of a mobile terminal or a personal computer.

The processing circuit 60 controls operations of the image sensor 20, the storage device 40, and the display device 50. The processing circuit 60 generates hyperspectral image data on the basis of a reconstruction table and image data generated by the image sensor 20. Furthermore, the processing circuit 60 performs processing necessary for calibration for correcting the reconstruction table. A computer program to be executed by the processing circuit 60 is stored in the memory 62 such as a ROM or a random access memory (RAM). That is, the imaging device 100 includes a processing device that includes the processing circuit 60 and the memory 62. The processing circuit 60 and the memory 62 may be integrated on a single circuit board or may be provided on separate circuit boards. Functions of the processing circuit 60 may be distributed into circuits.

The light source 70 is used for calibration for correcting a reconstruction table. The light source 70 emits reference light having a wavelength of at least one of four or more bands included in a target wavelength region W. The at least one band can be, for example, a band in which an error of the reconstruction table is considered to be occurring. The broken line with an arrow illustrated in FIG. 3 indicates an optical path of the reference light that passes through the optical system 30 and is incident on the light incidence surface 10s of the filter array 10. The filter array 10 and the optical system 30 are located on the optical path of the reference light. The light source 70 can be, for example, a surface light source that has a light emission surface 70s. The reference light is uniformly emitted from the whole light emission surface 70s. A size of the light emission surface 70s of the light source 70, a lens diameter of the optical system 30, and a size of the light incidence surface 10s of the filter array 10 are appropriately designed, and the reference light emitted from the light emission surface 70s of the light source 70 passes through the optical system 30 and is incident on the whole light incidence surface 10s of the filter array 10. According to such a configuration, the whole light incidence surface 10s of the filter array 10 can be uniformly irradiated with the reference light.

Spectral Data of Reference Light

Figure 4A:
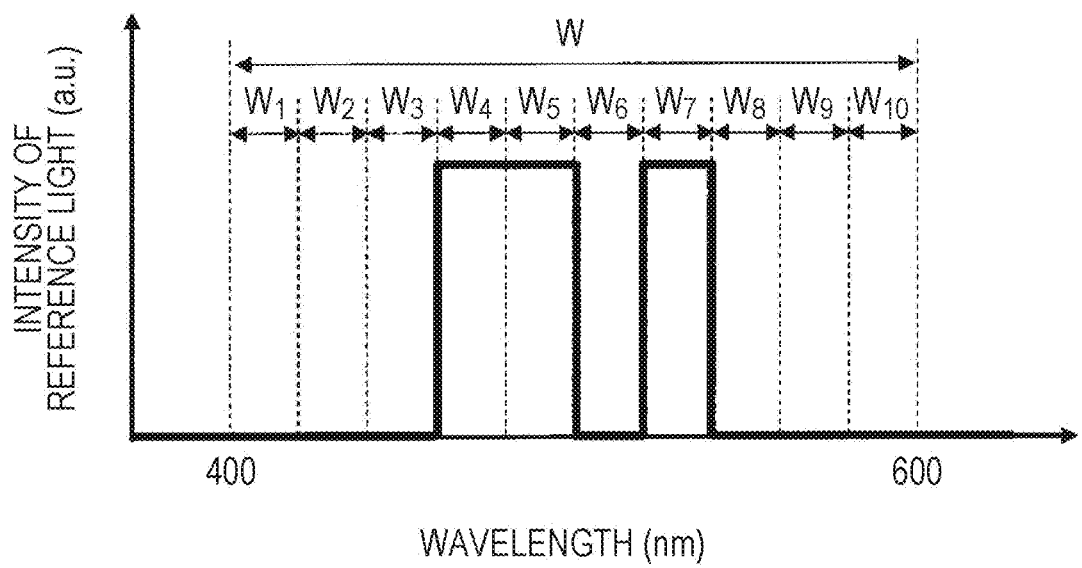
FIG. 4A schematically illustrates a first example of a spectrum of reference light emitted from a light source.
Figure 4B:
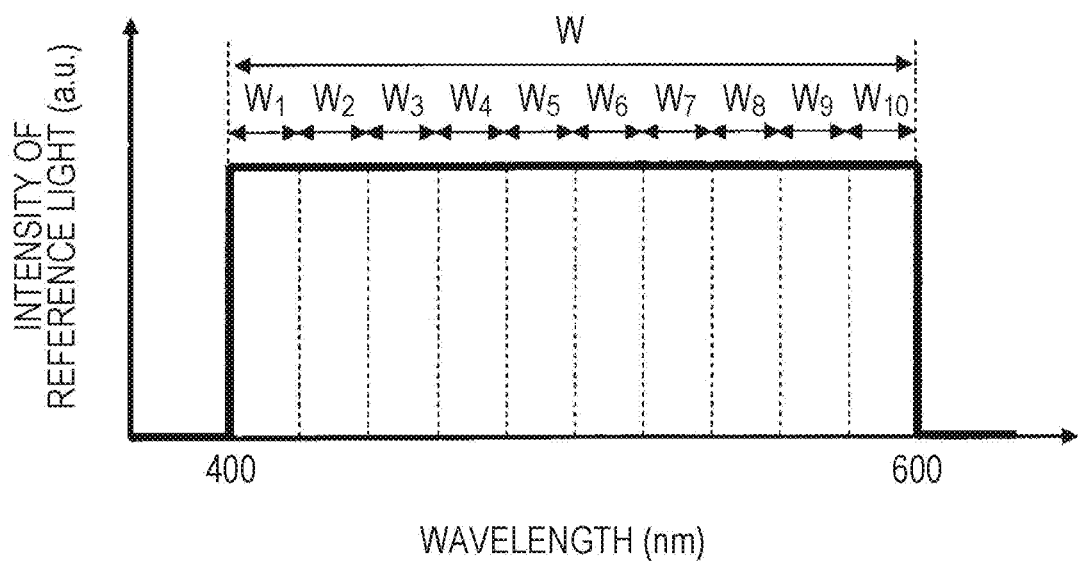
FIG. 4B schematically illustrates a second example of a spectrum of reference light emitted from the light source.

Next, an example of a spectrum of the reference light emitted from the light source 70 according to the present embodiment is described with reference to FIGS. 4A and 4B. FIGS. 4A and 4B schematically illustrate an example of the spectrum of the reference light emitted from the light source 70 according to the present embodiment. In FIGS. 4A and 4B, the vertical axis represents an intensity of the reference light, and the horizontal axis represents a wavelength. In the example illustrated in FIGS. 4A and 4B, the target wavelength region W is equal to or higher than 400 nm and equal to or lower than 600 nm. The target wavelength region W is divided into ten bands $W_1$ to $W_{10}$ each having a width of 20 nm. In the example illustrated in FIG. 4A, the reference light has wavelengths of the bands $W_4$, $W_5$, and $W_7$. This reference light is effective in a case where an error of the reconstruction table is occurring in the bands $W_4$, $W_5$, and $W_7$. In the example illustrated in FIG. 4B, the reference light has wavelengths of all of the bands $W_1$ to $W_{10}$. This reference light is effective in a case where an error of the reconstruction table is occurring in all of the bands $W_1$ to $W_{10}$. In a case where it is unknown in which band an error of the reconstruction table is occurring, the light source 70 may emit reference light having wavelengths of all of the bands $W_1$ to $W_{10}$. In a case where it is known in advance that an error of the reconstruction table is occurring in only one band, the light source 70 may emit only light having a wavelength of this band as the reference light. In a case where an error of the reconstruction table is occurring in one band and is not occurring in the other bands, the light source 70 may emit, as the reference light, light that includes light having a wavelength of this band and does not include light having wavelengths of the other bands.

In a case where no error is occurring in the reconstruction table, hyperspectral image data of the reference light can be, for example, one in which image data of all bands have same pixel values. In the example illustrated in FIG. 4A, image data of the bands $W_4$, $W_5$, and $W_7$ have same pixel values larger than zero. Image data of the other bands have pixel values of almost zero. In a case where the light source 70 emits such reference light, accuracy of calibration for correcting the reconstruction table can be improved.

The spectral data of the reference light emitted from the light source 70 can be, for example, acquired by any of the following methods (1) to (3):

(1) acquire the spectral data of the reference light by using a spectral device.
(2) acquire the spectral data of the reference light by using the imaging device 100 in which no error is occurring in the reconstruction table.
(3) use rated spectral data of the light source 70.

Data acquired by any one of the methods (1) to (3) may be offered as a dataset from a manufacturer of the light source 70. Alternatively, the method (1) or (2) may be executed by the user himself or herself.

The spectral data of the reference light may be stored in the storage device 40 before calibration for correcting a reconstruction table. Alternatively, the user may input the spectral data of the reference light by using an input device before or during calibration for correcting a reconstruction table. In this case, the processing circuit 60 acquires the input spectral data of the reference light from the input device.

Computation for Correcting Error of Reconstruction Table

Next, an example of computation for correcting an error of a reconstruction table is described. Image data g acquired by the image sensor 20, a reconstruction table A, and hyperspectral image data f satisfy the following formula (1):

$$g = Af \qquad (1)$$

The image data g and the hyperspectral image data f are data of a vector, and the reconstruction table A is data of a matrix. The image data g is expressed as a one-dimensional array, that is, a vector having $N_g$ elements where $N_g$ is the number of pixels of the image data g. A hyperspectral image includes images, and the hyperspectral image data f includes pixel values of pixels included in each of the images. The hyperspectral image data f is expressed as a one-dimensional array, that is, a vector having $N_f \times M$ elements where $N_f$ is the number of pixels included in each of the images and M is the number of bands. The reconstruction table A is expressed as a matrix having elements of $N_g$ rows and ($N_f \times M$) columns. $N_g$ and $N_f$ can be designed to have a same value. The number of bands M is equal to the number of images included in the hyperspectral image.

It seems that when the vector g and the matrix A are given, f can be calculated by solving an inverse problem of the formula (1). However, since the number of elements $N_f \times M$ of the data f to be obtained is larger than the number of elements $N_g$ of the data g, this problem is an ill-posed problem and cannot be solved. In view of this, the processing circuit 60 finds a solution by using a method of compressed sensing while utilizing redundancy of the images included in the data f. Specifically, the data f to be obtained is estimated by solving the following formula (2):

$$f' = \underset{f}{\operatorname{argmin}} \{\|g - Af\|_{l_2} + \tau \Phi(f)\} \qquad (2)$$

In the formula (2), f' represents the estimated data f. The first term in the parentheses in the above formula represents a difference amount between an estimation result Af and the acquired data g, that is, a residual term. Although a sum of squares is a residual term in this formula, an absolute value, a square-root of sum of squares, or the like may be a residual term. The second term in the parentheses is a regularization term or a stabilization term that will be described later. The formula (2) means that f that minimizes a sum of the first term and the second term is found. The processing circuit 60 can calculate the final solution f' by convergence of solutions by recursive iterative operation.

The first term in the parentheses in the formula (2) means operation of finding a sum of squares of a difference between the acquired data g and Af obtained by system conversion of f in the estimation process by the matrix A. $\Phi(f)$ in the second term is a constraint condition in regularization of f and is a function reflecting sparse information of the estimated data. This function has an effect of smoothing or stabilizing the estimated data. The regularization term can be, for example, expressed by discrete cosine transform (DCT), wavelet transform, Fourier transform, total variation (TV), or the like of f. For example, in a case where total variation is used, stable estimated data with suppressed influence of noise of the observed data g can be acquired. Sparsity of the target in the space of the regularization term varies depending on texture of the target. A regularization term that makes the texture of the target more sparse in the space of the regularization term may be selected. Alternatively, regularization terms may be included in calculation. $\tau$ is a weight coefficient. As the weight coefficient $\tau$ becomes larger, an amount of reduction of redundant data becomes larger, and a compression rate increases. As the weight coefficient $\tau$ becomes smaller, convergence to a solution becomes weaker. The weight coefficient $\tau$ is set to such a proper value that f converges to a certain extent and is not excessively compressed.

In a case where an error occurs between the reconstruction table A and transmission characteristics of an optical element such as the filter array 10 due to various causes such as aging deterioration, the actual reconstruction table is expressed by $A_s A$ in which an error component is a diagonal matrix $A_s$. In this case, a relationship $A_s A = A A_s$ is established. An error of a reconstruction table is an error of an element corresponding to a transmission spectrum that is included in the reconstruction table. In a case where reference light is detected by the image sensor 20, spectral data I of the reference light is used as the hyperspectral image data f. The image data g acquired by the image sensor 20, the actual reconstruction table $A A_s$, and the spectral data I of the reference light satisfy the following formula (3). In a case where the filters included in the filter array 10 are filters 1 to $N_f$ and the pixels included in the image sensor 20 are pixels 1 to $N_f$, the imaging device 100 may be designed so that light i output from a filter i is incident on a pixel i and is not incident on pixels 1 to (i−1) and pixels (i+1) to $N_f$ ($1 \leq I \leq N_f$). For example, the imaging device 100 may include a light guide part having a wall that separates an optical path i of the light i emitted from the filter i and incident on the pixel i and an optical path j of light j emitted from a filter j and incident on a pixel j ($1 \leq j \leq N_f$, $i \neq j$). That is, the filters included in the filter array 10 and the pixels included in the image sensor 20 may correspond on a one-to-one basis. In this case, the matrix A is a diagonal matrix.

$$g = A_s A I = A A_s I \qquad (3)$$

From comparison between the formula (1) and the formula (3), $f = A_s I$ is obtained as hyperspectral image data in a case where a reconstruction table in which an error is occurring is used. The error component $A_s$ can be calculated by excluding the two-dimensional spectral data I from the hyperspectral image data f. By multiplying the reconstruction table A before correction by the calculated error component $A_s$, the reconstruction table before correction can be corrected to the actual reconstruction table $A_s A$.

Imaging of Target

Figure 5:
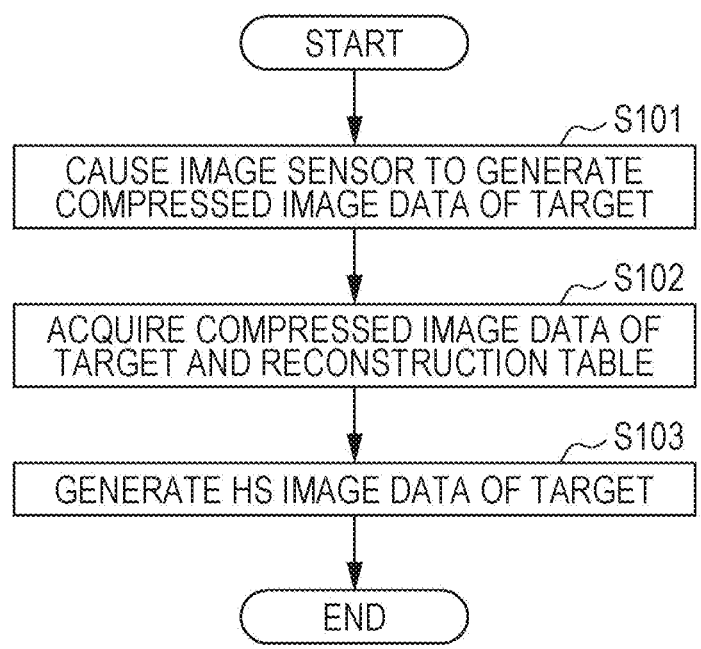
FIG. 5 is a flowchart illustrating an example of operation executed by a processing circuit during imaging.

An example of operation of the processing circuit 60 performed in a case where a target is imaged is described with reference to FIG. 5 before an example of calibration for correcting a reconstruction table is described. In this case, in the example illustrated in FIG. 3, a target is disposed in front of the imaging device 100 instead of the light source 70. FIG. 5 is a flowchart illustrating an example of operation executed by the processing circuit 60 in a case where a target is imaged. In FIG. 5 and subsequent drawings, "HS image" represents a hyperspectral image. A user transmits a signal for starting imaging of a target to the processing circuit 60 by using a GUI displayed on the display device 50. The processing circuit 60 performs operations in the following steps S101 to S103 upon receipt of the signal.

Step S101

The processing circuit 60 gives a command to perform imaging to the image sensor 20. In response to this command, the image sensor 20 images a target through the filter array 10, and generates compressed image data of the target.

Step S102

The processing circuit 60 acquires the compressed image data of the target from the image sensor 20 and acquires a reconstruction table from the storage device 40.

Step S103

The processing circuit 60 generates hyperspectral image data of the target by the formula (1) and the formula (2) on the basis of the compressed image data and the reconstruction table acquired in step S102. The processing circuit 60 may cause the generated hyperspectral image data to be stored in the storage device 40.

The generated hyperspectral image data can be used for various purposes such as inspection of a foreign substance contained in a target such as an industrial product or a food product and analysis of a component of a target. In a case where accuracy of analysis or inspection is low as for one or more of the bands included in the target wavelength region W, a user studies what causes this. In a case where it is found out as a result of the study that there is an error between the reconstruction table and characteristics of an optical element such as the filter array 10, the user performs calibration for correcting the error of the reconstruction table as follows.

Correction of Error of Reconstruction Table

In a case where the storage device 40 stores therein past correction data concerning the reconstruction table, the user uses the correction data. For example, in a case where an error occurs in a reconstruction result due to replacement of a lens included in the optical system 30, the error is considered to be caused by a change in property of the lens. Therefore, in a case where the same kind of lens was used in the past, the reconstruction table can be corrected by using past correction data. The same kind of lens is, for example, one having same focal length and f-number. In a case where past correction data and a use case are associated, the user can use the past correction data on the basis of the use case. Information on a use case is, for example, information such as "lens focal length: 100 nm, f-number: 2.4, installed at a belt conveyor No. 1 of the factory" as a case A and "lens focal length: 50 nm, f-number: 1.5, installed at a belt conveyor No. 3 of the factory" as a case B. As just described, information on a use case may include information concerning a status of use of an imaging system such as a lens focal length and f-number, and a lens installation place.

In a case where past correction data concerning the reconstruction table is not stored in the storage device 40, the user disposes the light source 70 in front of the imaging device 100 as illustrated in FIG. 3 and performs calibration for correcting the reconstruction table.

An example of operation of the processing circuit 60 in calibration for correcting a reconstruction table is described with reference to FIG. 6. FIG. 6 is a flowchart illustrating an example of operation executed by the processing circuit 60 in calibration. A user performs an operation of starting calibration by using a GUI displayed on the display device 50 after causing the light source 70 to emit reference light. In response to this operation, a signal for starting calibration is transmitted to the processing circuit 60. The processing circuit 60 performs operations in steps S201 to S206 below upon receipt of the signal. Note that in a configuration in which the processing circuit 60 can control the light source 70, the user does not need to perform an operation of causing the light source 70 to emit reference light. The processing circuit 60 may perform operations in steps S201 to S206 below after causing the light source 70 to emit reference light in response to a user's instruction to start calibration.

Step S201

The processing circuit 60 causes the image sensor 20 to detect the reference light that has passed through the filter array 10 and generate compressed image data. Hereinafter, the data is referred to as "reference image data". In a case where the light source 70 is a surface light source, the image sensor 20 generates the reference image data by imaging the light emission surface 70$s$ through the filter array 10. In the imaging system 200 according to the present embodiment, even in a case where the reference light includes light of wavelengths of bands, the image sensor 20 need just detect the reference light only one time. The reference light may include light of wavelengths of all bands included in a target wavelength region or may include only light of a wavelength of one or some of the bands included in the target wavelength region. The expression "reference light includes only light of a wavelength of one or some of the bands included in the target wavelength region" may be interpreted to mean that "the reference light includes light of a wavelength of one or some of the bands included in the target wavelength region and does not include light of wavelengths of the other bands of the target wavelength region. The target wavelength region is constituted by the one or some bands and the other bands." In a case where the wavelength of the reference light is variable, reference light of wavelengths of bands where an error is occurring in the reconstruction table may be detected separately plural times. For example, in a case where an error of the reconstruction table is occurring in three bands included in the target wavelength region, reference light of wavelengths of two of the three bands may be detected first, and reference light of a wavelength of a remaining one band may be detected next. In this case, the number of times of detection is two. Alternatively, reference light emitted for each of the three bands may be individually detected. In this case, the number of times of detection is three. As described above, the image sensor 20 can generate reference image data by detecting reference light a smaller number of times than the number of bands included in the target wavelength region W. Furthermore, the image sensor 20 can generate reference image data by detecting reference light a smaller number of times than the number of bands of the reconstruction table to be corrected.

Step S202

The processing circuit 60 acquires the reference image data from the image sensor 20 and acquires the reconstruction table from the storage device 40.

Step S203

The processing circuit 60 generates hyperspectral image data of the reference light from the data acquired in step S202. The data has a pixel value larger than zero in image data concerning at least one band included in the reference light and has a pixel value of almost zero in image data concerning the other bands. Hereinafter, image data concerning at least one band included in the reference light is referred to as "reference reconstructed image data". The processing circuit 60 may cause the reference reconstructed image data to be stored in the storage device 40.

The operations in steps S201 to S203 are identical to the operations in steps S101 to S103 illustrated in FIG. 5 except for that an imaging target is not a target of inspection, but reference light emitted from the light source 70.

Step S204

The processing circuit 60 acquires spectral data of the reference light. In a case where the spectral data of the reference light is stored in the storage device 40, the processing circuit 60 acquires the spectral data of the reference light from the storage device 40. Alternatively, in a case where the user inputs the spectral data of the reference light by using an external input device, the processing circuit 60 acquires the spectral data of the reference light from the input device.

Step S205

The processing circuit 60 corrects the error of the reconstruction table on the basis of the reference reconstructed image data generated in step S203 and the spectral data of the reference light acquired in step S204. Specific computation of the correction has been already described above.

Step S206

The processing circuit 60 updates the reconstruction table stored in the storage device 40 to the reconstruction table corrected in step S205. The processing circuit 60 causes the corrected reconstruction table to be newly stored in the storage device 40 instead of the reconstruction table before the correction. Depending on intended use, the corrected reconstruction table may be separately stored in the storage device 40 while keeping the reconstruction table before the correction in the storage device 40.

The reconstruction table is corrected as described above. The user generates hyperspectral image data of the target again by performing steps S101 to S103 illustrated in FIG. 5 by using the corrected reconstruction table. In a case where the error of the reconstruction table is correctly corrected, the hyperspectral image data can be more accurately generated. It can therefore be expected that accuracy of analysis is improved by the hyperspectral image data generated again. In a case where accuracy of analysis does not improve, there is a possibility that the error of the reconstruction table has not been correctly corrected, and therefore the user sends the imaging device 100 back to a manufacturer.

According to the imaging system 200 according to the present embodiment, it is unnecessary to disperse reference light into bands, and it is unnecessary to diffusely reflect the reference light and make the reference light uniform. Accordingly, the imaging system 200 according to the present embodiment need not include a spectroscopic element nor an integrating sphere, and is therefore small is size and inexpensive. Furthermore, the imaging system according to the present embodiment does not need strict temperature management. According to the imaging system according to the present embodiment, a user can easily perform calibration for correcting a reconstruction table under an actual use environment.

Data Stored in Storage Device

Next, an example of data stored in the storage device 40 is described with reference to FIGS. 7A to 7C. FIGS. 7A to 7C schematically illustrate an example of data stored in the storage device 40. FIG. 7A illustrates an example of a reconstruction table. FIG. 7B illustrates an example of spectral data of reference light emitted from the light source 70. In a case where light sources are used for different purposes, pieces of spectral data of reference light corresponding to the light sources can be stored in the storage device 40. FIG. 7C illustrates an example of past correction data concerning a reconstruction table. In a case where there are use cases, pieces of past correction data corresponding to the use cases can be stored in the storage device 40.

The reconstruction table illustrated in FIG. 7A includes information on light transmittance of filters that are two-dimensionally arranged in each band. Filter numbers such as a filter 1 and a filter 2 illustrated in FIG. 7A are identification number of the filters included in the filter array 10. Values equal to or larger than 0 and equal to or smaller than 1 illustrated in FIG. 7A represent light transmittance of the filters. The spectral data of the reference light illustrated in FIG. 7B includes information on a spectral intensity of each band. In a case where the light source 70 is a surface light source, light of the spectral intensity illustrated in FIG. 7B is uniformly emitted for each band from the whole light emission surface 70$s$. The past correction data concerning the reconstruction table illustrated in FIG. 7C indicate correction rates of light transmittance of the filters in each band. In a case where the reconstruction table is corrected by using the past correction data, the light transmittance of the reconstruction table illustrated in FIG. 7A is multiplied by the corresponding correction rates illustrated in FIG. 7C.

GUI Displayed on Display Device

Next, an example of a GUI displayed on the display device 50 is described with reference to FIGS. 8A and 8B. FIG. 8A schematically illustrates a first example of the GUI displayed on the display device 50. A user selects a button for taking a hyperspectral image that is located on an upper left side of the GUI illustrated in FIG. 8A or a button for calibration that is located on an upper right side depending on a purpose. FIG. 8A illustrates an example of the GUI displayed in a case where the button for calibration has been selected.

The GUI illustrated in FIG. 8A includes a load button for loading spectral data of reference light and a start button for starting calibration. The user loads the spectral data of the reference light by selecting the load button. Then, the user starts calibration by selecting the start button. The GUI illustrated in FIG. 8A further includes a save button for saving correction data after calibration and a load button for loading the saved correction data. After calibration, the user saves correction data in association with a use case by selecting the save button.

In a case where past correction data concerning a reconstruction table is stored in the storage device 40, correction data suitable for calibration among the past correction data may be loaded.

The user inputs, on the GPU, information such as information concerning a status of use of an imaging system for which calibration is to be performed and loads past correction data by selecting the load button. By this operation, correction data identical or similar in terms of a status of use to the imaging system for which calibration is to be performed among the past correction data can be loaded. Then, the user starts calibration by selecting the start button. In this way, calibration is performed on the basis of the loaded correction data.

Alternatively, use cases corresponding to the past correction data may be displayed on the display device 50, and the user may select a use case appropriate for calibration from among the displayed use cases. FIG. 8B schematically illustrates a second example of the GUI displayed on the display device 50. The GUI illustrated in FIG. 8B includes pull-down lists concerning an imaging target, a wavelength of calibration, and a lens used. The "LIGHTING", "WHITE BOARD", and "COLOR CHART" included in the list concerning the imaging target will be described later. The user selects a use case that is identical or similar in terms of a status of use to the imaging system for which calibration is to be performed from among the use cases included in the list. Then, the user starts calibration by selecting a start button. In this way, calibration is performed on the basis of the selected use case.

External Shape of Imaging System

Figure 9A:
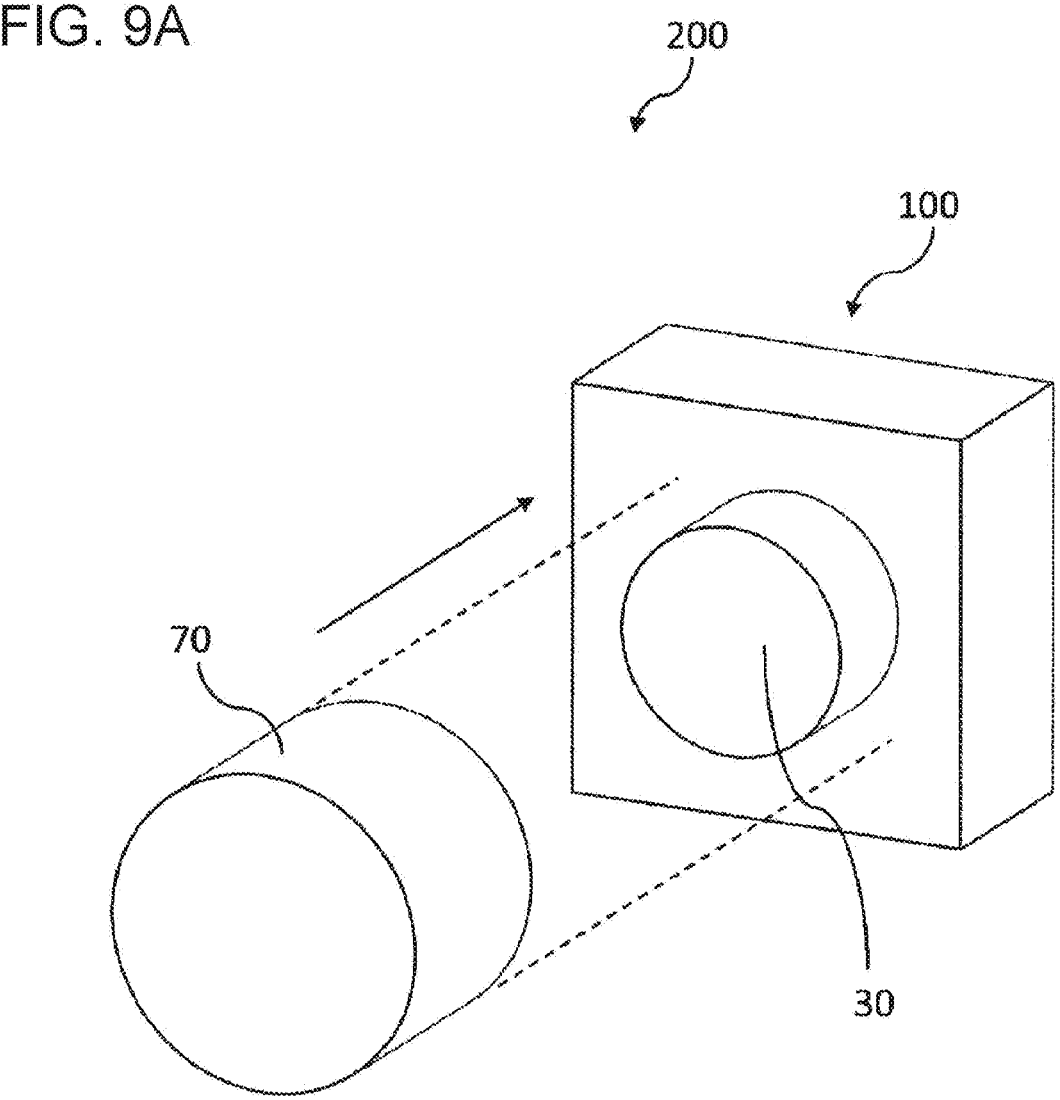
FIG. 9A is a perspective view schematically illustrating an example of an external shape of the imaging system.
Figure 9B:
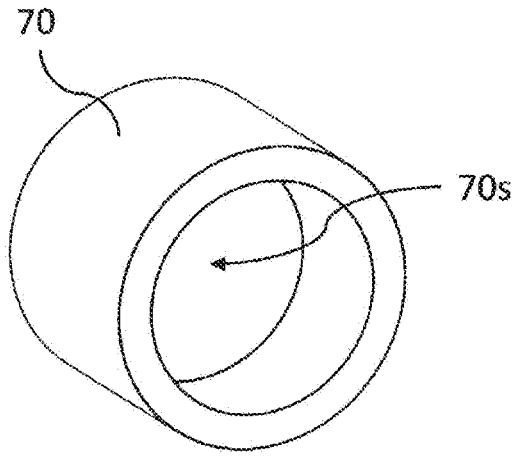
FIG. 9B is a perspective view of the light source illustrated in FIG. 9A viewed from a light emission surface side.

An example of an external shape of the imaging system 200 according to the present embodiment is described with reference to FIGS. 9A and 9B. FIG. 9A is a perspective view schematically illustrating an example of an external shape of the imaging system 200 according to the present embodiment. FIG. 9B is a perspective view of the light source 70 illustrated in FIG. 9A viewed from a light emission surface 70s side. As illustrated in FIG. 9A, the light source 70 is attached, as an attachment, to the optical system 30 of the imaging device 100 in a direction indicated by the arrow. The light source 70 need not include a spectroscopic element and therefore can be a small-sized attachment. As illustrated in FIG. 9B, the light source 70 has a shape of a cylinder having a bottom. An inner bottom surface is the light emission surface 70s. When the light source 70 is attached to the optical system 30, the optical system 30 fits in a cylindrical part of the light source 70. According to such a configuration, reference light emitted from the light emission surface 70s of the light source 70 can be efficiently incident on the optical system 30. Since it is only necessary to attach the light source 70 to the optical system 30 in the configuration illustrated in FIG. 9A, it is unnecessary to move the imaging device 100 from a current place to perform calibration.

Modifications

Although the embodiment of the present disclosure has been illustrated above, the present disclosure is not limited to the above embodiment and can be modified in various ways. Modifications 1 and 2 of the embodiment of the present disclosure are described below with reference to FIGS. 10A and 10B.

Figure 10A:
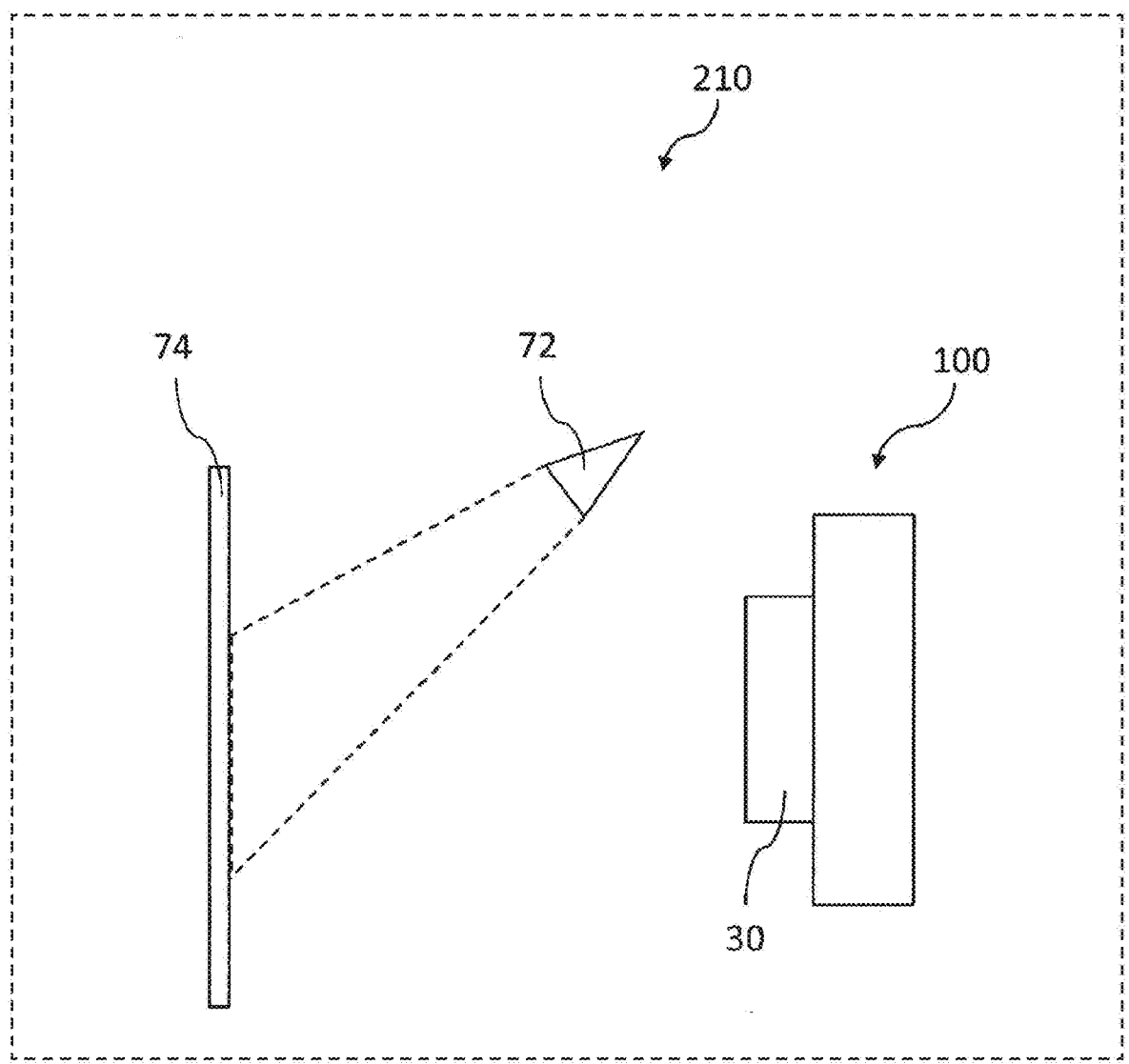
FIG. 10A schematically illustrates an example of an imaging system according to Modification 1 of the embodiment of the present disclosure.

FIG. 10A schematically illustrates an example of an imaging system according to Modification 1 of the embodiment of the present disclosure. An imaging system 210 illustrated in FIG. 10A includes an imaging device 100, a light source 72, and a white board 74 as a reference object. A region surrounded by the broken line illustrated in FIG. 10A schematically indicates a range of light emitted from the light source 72 toward the white board 74. The light emitted from the light source 72 and reflected by the white board 74 enters the optical system 30 as reference light. A reflection spectrum of the white board 74 can, for example, be almost flat or gradually change in a target wavelength region. In step S201 illustrated in FIG. 6, the processing circuit 60 causes the image sensor 20 to detect the reference light that has passed through the filter array 10 and generate reference image data. In Modification 1, spectral data of the reference light used for correction of a reconstruction table may be stored in the storage device 40 before calibration for correcting the reconstruction table. Alternatively, a user may input the spectral data of the reference light by using an input device before or in the middle of calibration for correcting the reconstruction table. In Modification 1, the spectral data of the reference light stored in the storage device 40 or input by the user can be, for example, spectral data of light obtained under a similar condition to the calibration. In a case where the spectral data of the reference light is stored in the storage device 40, information concerning a type and/or a model number of the light source 72 and a type of white board 74 and the spectral data of the reference light may be stored in association with each other.

Figure 10B:
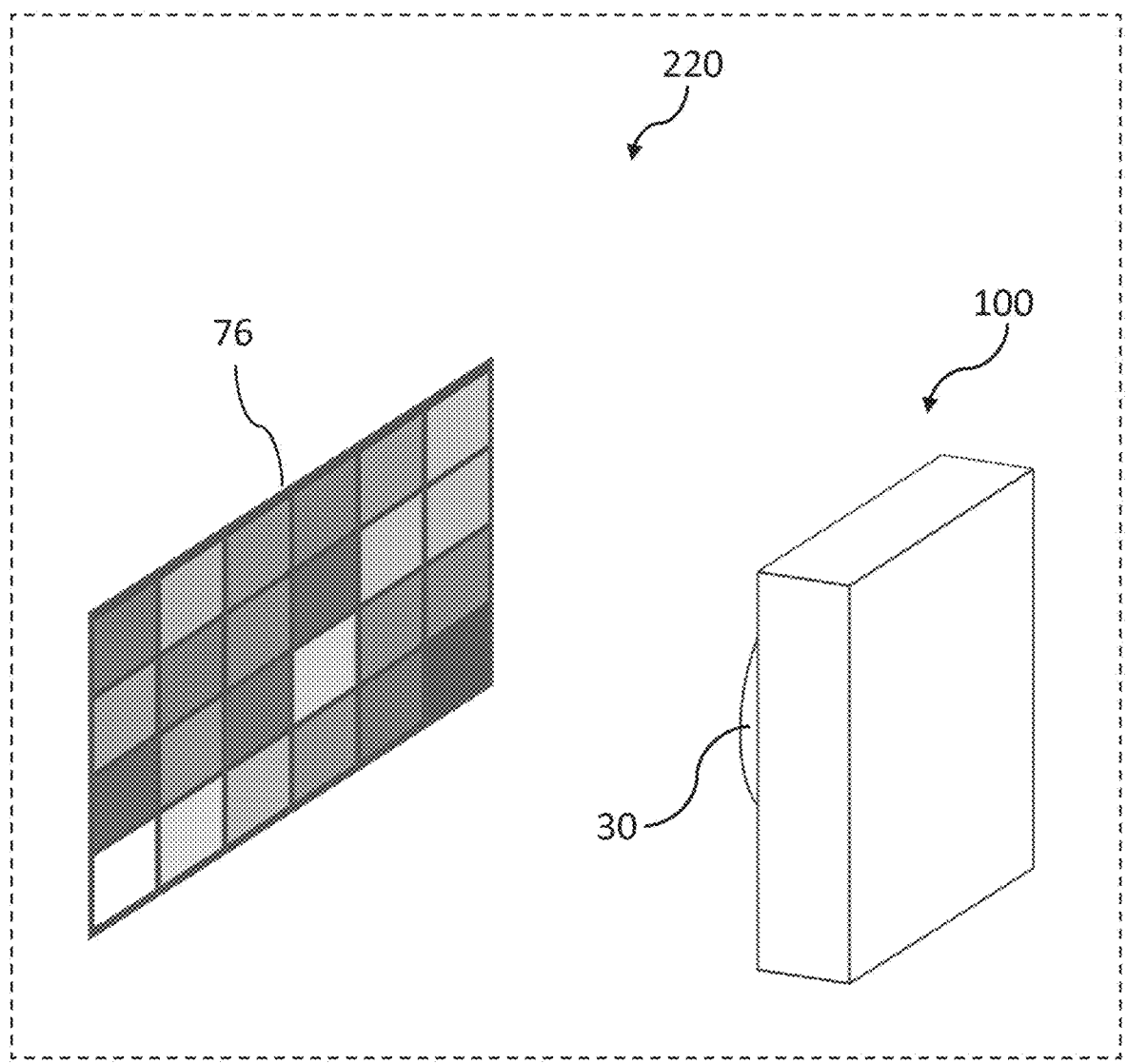
FIG. 10B schematically illustrates an example of an imaging system according to Modification 2 of the embodiment of the present disclosure.

FIG. 10B schematically illustrates an example of an imaging system according to Modification 2 of the embodiment of the present disclosure. An imaging system 220 illustrated in FIG. 10B includes an imaging device 100 and a color chart 76 as a reference object. The color chart 76 includes color samples that are two-dimensionally arranged. Light generated by reflection of environment light such as solar light or illumination light on the color chart 76 enters the optical system 30 as reference light. In step S201 illustrated in FIG. 6, the processing circuit 60 causes the image sensor 20 to detect the reference light that has passed through the filter array 10 and generate reference image data.

In Modification 2, spectral data of the reference light used for correction of a reconstruction table may be stored in the storage device 40 before calibration for correcting the reconstruction table. Alternatively, a user may input the spectral data of the color chart 76 by using an input device before or in the middle of calibration for correcting the reconstruction table. In Modification 2, the spectral data of the reference light stored in the storage device 40 or input by the user can be, for example, spectral data of light obtained under a similar condition to the calibration. In a case where the spectral data of the reference light is stored in the storage device 40, information concerning a type and/or a model number of the color chart 76 and the spectral data of the reference light may be stored in association with each other.

Other Remarks 1

An imaging system according to an aspect of the present disclosure may be as follows.

The imaging system comprises an imaging device, wherein
  the imaging device includes a filter including regions, an image sensor, a memory in which a first matrix is stored, and a circuit,
  the regions exhibit kinds of transmittance characteristics in a wavelength region,
  the kinds of transmittance characteristics correspond one-to-one to the regions, the kinds of transmittance characteristics are different from one another, wavelength bands include first to n-th wavelength bands, and n is a natural number of 4 or more,
  (a) during a first period, which is a period before calibration of the imaging device,
  (a-1) the filter receives first light including light from a first subject and outputs second light, and the image sensor outputs a first image including first image data in response to the second light incident on the image sensor, and
  (a-2) the circuit generates pieces of second image data on the basis of the first matrix A1 and the first image data, the wavelength bands corresponding one-to-one to the pieces of second image data, $g1=A1f2=A1(f21 \ldots f2n)^T$ where g1 represents a column vector having, as components, pixel values included in the first image data, A1 represents the first matrix, and f21 to f2n represent column vectors and correspond to the pieces of second image data,
  (b) during a second period where the calibration is performed,
  (b-1) the filter receives third light from a light source and outputs fourth light, and the image sensor outputs a third image including third image data in response to the fourth light incident on the image sensor, and
  (b-2) the circuit determines a second matrix on the basis of the first matrix, the third image data, and fourth data, the second matrix being a diagonal matrix, $g3=A2A1f4$ where g3 represents a column vector having pixel values included in the third image data, A2 represents a second matrix, and f4 represents the fourth data, (c) during a third period after the calibration, (c-1) the filter receives fifth light including light from a second subject and outputs sixth light, and the image sensor outputs a fifth image including fifth image data in response to the sixth light incident on the image sensor, and (c-2) the circuit generates pieces of sixth image data on the basis of the first matrix, the second matrix, and the fifth image data, the wavelength bands corresponding one-to-one to the pieces of sixth image data, $g5=A2A1f6=A2A1(f61 \ldots f6n)^T$ where g5 represents a column vector having, as components, pixel values included in the fifth image data, and f61 to f6n represent column vectors and correspond to the pieces of sixth image data, the first light includes light of the first wavelength band to light of the n-th wavelength band, the fifth light includes light of the first wavelength band to light of the n-th wavelength band, the third light includes light of an i-th wavelength band, the third light does not include light of the first wavelength band to light of an (i−1)th wavelength band, the third light does not include light of an (i+1)th wavelength band to light of the n-th wavelength band, $$f4=(f41 \ldots f4n)^T,$$

$f41=(0 \ldots 0)$ to $f4(i-1)=(0 \ldots 0)$, $f4i=(p \ldots p)$, $f4(i+1)=(0 \ldots 0)$ to $f4n=(0 \ldots 0)$ where p corresponds to an intensity of light of the i-th wavelength band included in the third light, and i is a natural number equal to or larger than 1 and equal to or smaller than n. The imaging system described above is described below while referring to the imaging system 200.

A period before calibration of the imaging device 100 is referred to as a first period, a period during the calibration of the imaging device 100 is referred to as a second period, and a period after the calibration of the imaging device 100 is referred to as a third period.

The target wavelength region W includes wavelength bands. The wavelength bands are first to n-th wavelength bands. An i-th wavelength band and a j-th wavelength band do not include a same wavelength (1≤i<j≤n). The filter array 10 includes regions. The regions exhibit kinds of transmittance characteristics in the target wavelength region W. The kinds of transmittance characteristics are different from one another. The regions correspond one-to-one to the kinds of transmittance characteristics.

n is a natural number of 4 or more. In the following description, for example, it is assumed that n=4. The wavelength bands included in the target wavelength region W are referred to as a wavelength band $W_1$, a wavelength band $W_2$, a wavelength band $W_3$, and a wavelength band $W_4$. The image sensor 20 outputs a compressed image. In the following description, it is assumed that the number Ng of pixels of the compressed image is 2×3=6. The number Ng of pixels may be 6 or more.

Operation During First Period

The filter array 10 receives first light including light from a first subject and outputs second light. The first light includes light of a first wavelength band to light of a fourth wavelength band.

The image sensor 20 receives the second light and outputs a first image including first image data g1 to the processing circuit 60.

Figure 11A:
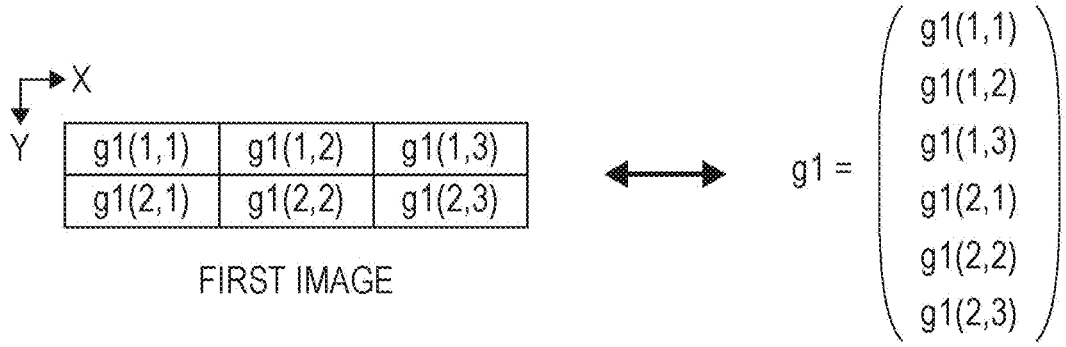
FIG. 11A illustrates a first image and image data expressed in a matrix form.

FIG. 11A illustrates the first image and the image data g1 expressed in a matrix form. The first image includes a pixel located at coordinates (1, 1) that has a pixel value g1(1, 1) to a pixel located at coordinates (2, 3) that has a pixel value g1(2, 3). The image data g1 corresponding to the first image includes the pixel values g1(1, 1) to g1(2, 3).

The processing circuit 60 generates pieces of second image data corresponding to the wavelength bands included in the target wavelength region W on the basis of the first image data g1 and a first matrix A1 stored in the storage device 40.

The wavelength bands are the wavelength band $W_1$, the wavelength band $W_2$, the wavelength band $W_3$, and the wavelength band $W_4$, and the pieces of second image data are image data f21, image data f22, image data f23, and image data f24.

The first image may be regarded as an image in which an image Im21 corresponding to the wavelength band $W_1$, an image Im22 corresponding to the wavelength band $W_2$, an image Im23 corresponding to the wavelength band $W_3$, and an image Im24 corresponding to the wavelength band $W_4$ are superimposed (see, for example, FIG. 1B).

The image data f21 corresponds to the image Im21, the image data f22 corresponds to the image Im22, the image data f23 corresponds to the image Im23, and the image data f24 corresponds to the image Im24.

The formula (1) can be expressed as g1=A1f2 by using the first image data g1 included in the first image and hyperspectral image data f2. The filters included in the filter array 10 and the pixels included in the image sensor 20 may correspond on a one-to-one basis. In this case, A1 is a diagonal matrix.

$$f2 = \begin{pmatrix} f21 \\ f22 \\ f23 \\ f24 \end{pmatrix}$$

$$g1 = \begin{pmatrix} g1(1,1) \\ g1(1,2) \\ g1(1,3) \\ g1(2,1) \\ g1(2,2) \\ g1(2,3) \end{pmatrix} = A1 \begin{pmatrix} f21 \\ f22 \\ f23 \\ f24 \end{pmatrix} = \begin{pmatrix} a_{11} & \cdots & a_{124} \\ \vdots & \ddots & \vdots \\ a_{61} & \cdots & a_{624} \end{pmatrix} \begin{pmatrix} f21(1,1) \\ f21(1,2) \\ f21(1,3) \\ f21(2,1) \\ f21(2,2) \\ f21(2,3) \\ f22(1,1) \\ \vdots \\ f23(2,3) \\ f24(1,1) \\ f24(1,2) \\ f24(1,3) \\ f24(2,1) \\ f24(2,2) \\ f24(2,3) \end{pmatrix}$$

Figure 11B:
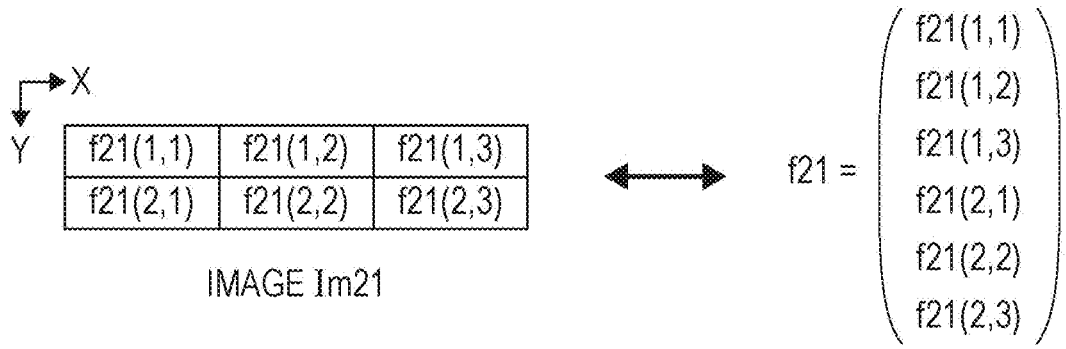
FIG. 11B illustrates an image and image data expressed in a matrix form.

FIG. 11B illustrates the image Im21 and the image data f21 expressed in a matrix form. The image Im21 includes a pixel located at coordinates (1, 1) that has a pixel value f21(1, 1) to a pixel located at coordinates (2, 3) that has a pixel value f21(2, 3). The image data f21 corresponding to the image Im21 includes pixel values f21(1, 1) to f21(2, 3).

Figure 11C:
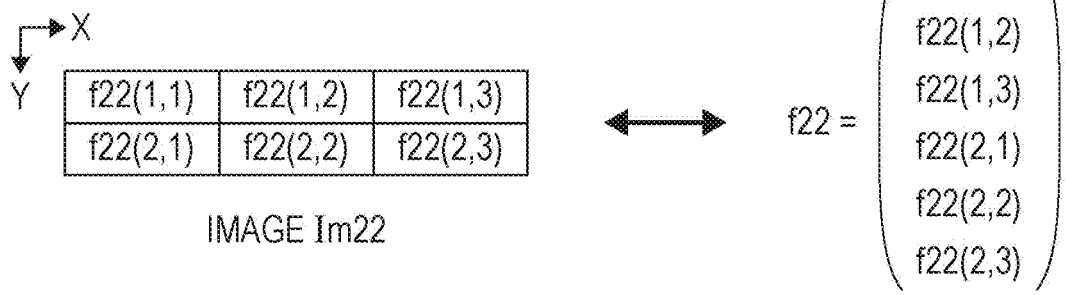
FIG. 11C illustrates an image and image data expressed in a matrix form.

FIG. 11C illustrates the image Im22 and the image data f22 expressed in a matrix form. The image Im22 includes a pixel located at coordinates (1, 1) that has a pixel value f22(1, 1) to a pixel located at coordinates (2, 3) that has a pixel value f22(2, 3). The image data f22 corresponding to the image Im22 includes pixel values f22(1, 1) to f22(2, 3).

Figure 11D:
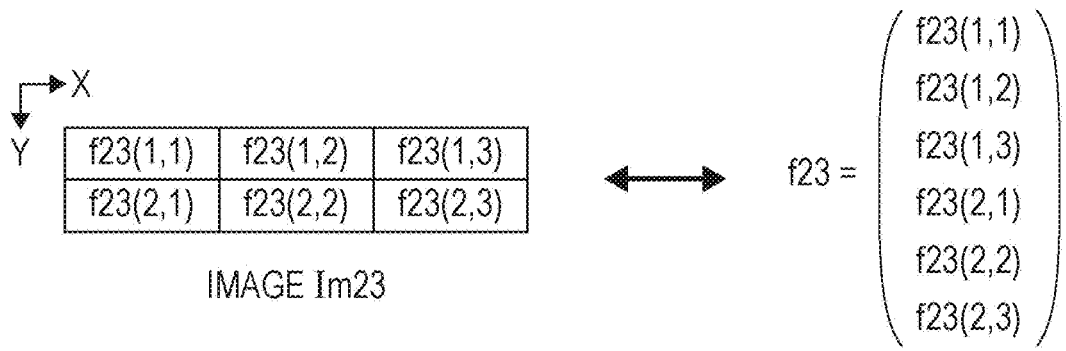
FIG. 11D illustrates an image and image data expressed in a matrix form.

FIG. 11D illustrates the image Im23 and the image data f23 expressed in a matrix form. The image Im23 includes a pixel located at coordinates (1, 1) that has a pixel value f23(1, 1) to a pixel located at coordinates (2, 3) that has a pixel value f23(2, 3). The image data f23 corresponding to the image Im23 includes pixel values f23(1, 1) to f23(2, 3).

Figure 11E:
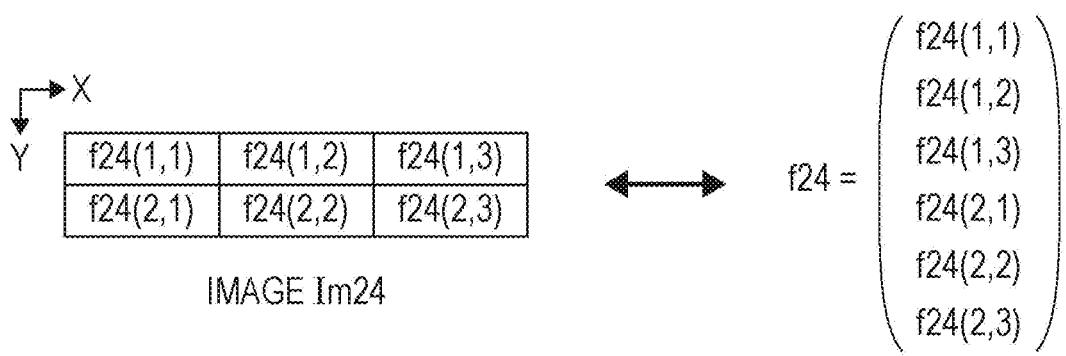
FIG. 11E illustrates an image and image data expressed in a matrix form.

FIG. 11E illustrates the image Im24 and the image data f24 expressed in a matrix form. The image Im24 includes a pixel located at coordinates (1, 1) that has a pixel value f24(1, 1) to a pixel located at coordinates (2, 3) that has a pixel value f24(2, 3). The image data f24 corresponding to the image Im24 includes pixel values f24(1, 1) to f24(2, 3).

Operation During Second Period

Figure 12:
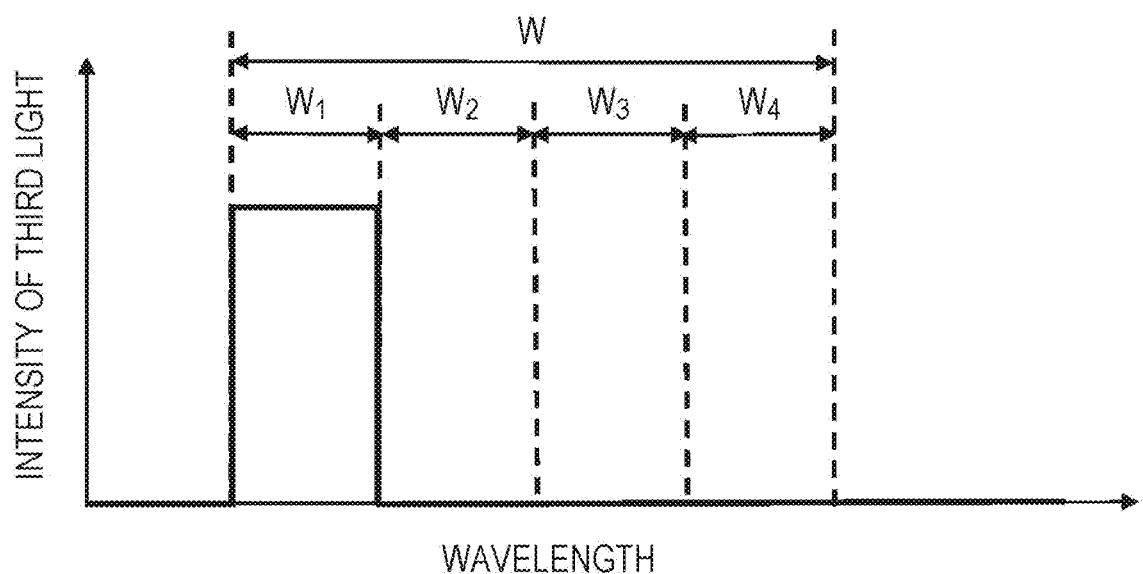
FIG. 12 illustrates spectral data of third light.

The filter array 10 receives third light emitted from the light source 70 and outputs fourth light. The third light may be reference light described in the embodiment (see, for example, FIGS. 4A and 4B). FIG. 12 illustrates spectral data of the third light. The third light includes light of the wavelength band $W_1$, does not include light of the wavelength band $W_2$, does not include light of the wavelength band $W_3$, and does not include light of the wavelength band $W_4$.

The image sensor 20 receives the fourth light and outputs a third image including third image data g3 to the processing circuit 60.

FIG. 13A illustrates the third image and the image data g3 expressed in a matrix form. The third image includes a pixel located at coordinates (1, 1) that has a pixel value g3(1, 1) to a pixel located at coordinates (2, 3) that has a pixel value g3(2, 3). The image data g3 corresponding to the third image includes pixel values g3(1, 1) to g3(2, 3).

The processing circuit 60 determines a second matrix As on the basis of the first matrix A1, the third image data g3, and fourth data I. The processing circuit 60 causes the second matrix As to be stored in the storage device 40.

The third image may be regarded as an image in which an image Im41 corresponding to the wavelength band $W_1$, an image Im42 corresponding to the wavelength band $W_2$, an image Im43 corresponding to the wavelength band $W_3$, and an image Im44 corresponding to the wavelength band $W_4$ are superimposed (see, for example, FIG. 1B).

The wavelength bands are the wavelength band $W_1$, the wavelength band $W_2$, the wavelength band $W_3$, and the wavelength band $W_4$, and the pieces of fourth image data are image data f41, image data f42, image data f43, and image data f44.

The formula (1) can be expressed as g3=AsA1f4 by using the third image data g3 included in the third image and hyperspectral image data f4. As is a diagonal matrix, and AsA1f4=A1Asf4.

$$f4 = \begin{pmatrix} f41 \\ f42 \\ f43 \\ f44 \end{pmatrix}$$

$$g3 = \begin{pmatrix} g3(1,1) \\ g3(1,2) \\ g3(1,3) \\ g3(2,1) \\ g3(2,2) \\ g3(2,3) \end{pmatrix} =$$

$$AsA1\begin{pmatrix} f41 \\ f42 \\ f43 \\ f44 \end{pmatrix} = \begin{pmatrix} \alpha_{11} & 0 & 0 & 0 & 0 & 0 \\ 0 & \alpha_{22} & 0 & 0 & 0 & 0 \\ 0 & 0 & \alpha_{33} & 0 & 0 & 0 \\ 0 & 0 & 0 & \alpha_{44} & 0 & 0 \\ 0 & 0 & 0 & 0 & \alpha_{55} & 0 \\ 0 & 0 & 0 & 0 & 0 & \alpha_{66} \end{pmatrix} \begin{pmatrix} a_{11} & \cdots & a_{124} \\ \vdots & \ddots & \vdots \\ a_{61} & \cdots & a_{624} \end{pmatrix} \begin{pmatrix} p1 \\ p1 \\ p1 \\ p1 \\ p1 \\ p1 \\ 0 \\ \vdots \\ 0 \\ 0 \\ 0 \\ 0 \\ 0 \\ 0 \end{pmatrix}$$

FIG. 13B illustrates the image Im41 and the image data f41 expressed in a matrix form. The image Im41 includes a pixel located at coordinates (1, 1) that has a pixel value f41(1, 1) to a pixel located at coordinates (2, 3) that has a pixel value f41(2, 3). The image data f41 corresponding to the image Im41 includes pixel values f41(1, 1) to f41(2, 3). Since the third light exhibits spectral data such as the one illustrated in FIG. 12, pixel values of all pixels included in the image Im41 have the same value, for example, p (p is a value equal to or larger than 0).

FIG. 13C illustrates the image Im42 and the image data f42 expressed in a matrix form. The image Im42 includes a pixel located at coordinates (1, 1) that has a pixel value f42(1, 1) to a pixel located at coordinates (2, 3) that has a pixel value f42(2, 3). The image data f42 corresponding to the image Im42 includes pixel values f42(1, 1) to f42(2, 3). Since the third light exhibits spectral data such as the one illustrated in FIG. 12, pixel values of all pixels included in the image Im42 are zero.

FIG. 13D illustrates the image Im43 and the image data f43 expressed in a matrix form. The image Im43 includes a pixel located at coordinates (1, 1) that has a pixel value f43(1, 1) to a pixel located at coordinates (2, 3) that has a pixel value f43(2, 3). The image data f43 corresponding to the image Im43 includes pixel values f43(1, 1) to f43(2, 3). Since the third light exhibits spectral data such as the one illustrated in FIG. 12, pixel values of all pixels included in the image Im43 are zero.

FIG. 13E illustrates the image Im44 and the image data f44 expressed in a matrix form. The image Im44 includes a pixel located at coordinates (1, 1) that has a pixel value f44(1, 1) to a pixel located at coordinates (2, 3) that has a pixel value f44(2, 3). The image data f44 corresponding to the image Im44 includes pixel values f44(1, 1) to f44(2, 3). Since the third light exhibits spectral data such as the one illustrated in FIG. 12, pixel values of all pixels included in the image Im44 are zero.

Operation During Third Period

The filter array 10 receives fifth light including light from a second subject and outputs sixth light. The fifth light includes light of a first wavelength band to light of a fourth wavelength band. The second subject may be the first subject.

The image sensor 20 receives the sixth light and outputs a fifth image including fifth image data g5 to the processing circuit 60.

Figure 14A:
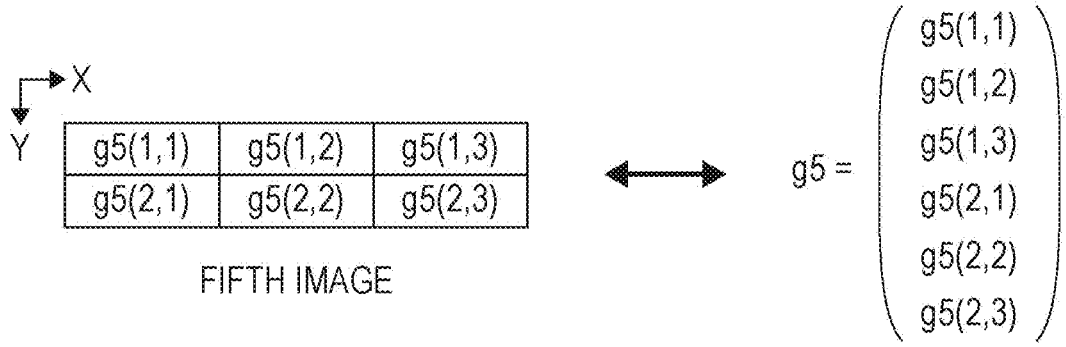
FIG. 14A illustrates a fifth image and image data expressed in a matrix form.

FIG. 14A illustrates the fifth image and the image data g5 expressed in a matrix form. The fifth image includes a pixel located at coordinates (1, 1) that has a pixel value g5(1, 1)

to a pixel located at coordinates (2, 3) that has a pixel value g5(2, 3). The image data g5 corresponding to the fifth image includes pixel values g5(1, 1) to g5(2, 3).

The processing circuit 60 generates pieces of sixth image data corresponding to the wavelength bands included in the target wavelength region W on the basis of the fifth image data g5 and the first matrix A1 and the second matrix As stored in the storage device 40.

The wavelength bands are the wavelength band $W_1$, the wavelength band $W_2$, the wavelength band $W_3$, and the wavelength band $W_4$, and the pieces of sixth image data are image data f61, image data f62, image data f63, and image data f64.

The fifth image may be regarded as an image in which an image Im61 corresponding to the wavelength band $W_1$, an image Im62 corresponding to the wavelength band $W_2$, an image Im63 corresponding to the wavelength band $W_3$, and an image Im64 corresponding to the wavelength band $W_4$ are superimposed (see, for example, FIG. 1B).

The image data f61 corresponds to the image Im61, the image data f62 corresponds to the image Im62, the image data f63 corresponds to the image Im63, and the image data f64 corresponds to the image Im64.

The formula (1) can be expressed as g5=AsA1f6=A1Asf6 by using the fifth image data g5 included in the fifth image and hyperspectral image data f6.

$$f6 = \begin{pmatrix} f61 \\ f62 \\ f63 \\ f64 \end{pmatrix}$$

$$g5 = \begin{pmatrix} g5(1,1) \\ g5(1,2) \\ g5(1,3) \\ g5(2,1) \\ g5(2,2) \\ g5(2,3) \end{pmatrix} =$$

$$AsA1 \begin{pmatrix} f61 \\ f62 \\ f63 \\ f64 \end{pmatrix} = \begin{pmatrix} \alpha_{11} & 0 & 0 & 0 & 0 & 0 \\ 0 & \alpha_{22} & 0 & 0 & 0 & 0 \\ 0 & 0 & \alpha_{33} & 0 & 0 & 0 \\ 0 & 0 & 0 & \alpha_{44} & 0 & 0 \\ 0 & 0 & 0 & 0 & \alpha_{55} & 0 \\ 0 & 0 & 0 & 0 & 0 & \alpha_{66} \end{pmatrix} \begin{pmatrix} a_{11} & \cdots & a_{124} \\ \vdots & \ddots & \vdots \\ a_{61} & \cdots & a_{624} \end{pmatrix} \begin{pmatrix} f61(1,1) \\ f61(1,2) \\ f61(1,3) \\ f61(2,1) \\ f61(2,2) \\ f61(2,3) \\ f62(1,1) \\ \vdots \\ f63(2,3) \\ f64(1,1) \\ f64(1,2) \\ f64(1,3) \\ f64(2,1) \\ f64(2,2) \\ f64(2,3) \end{pmatrix}$$

Figure 14B:
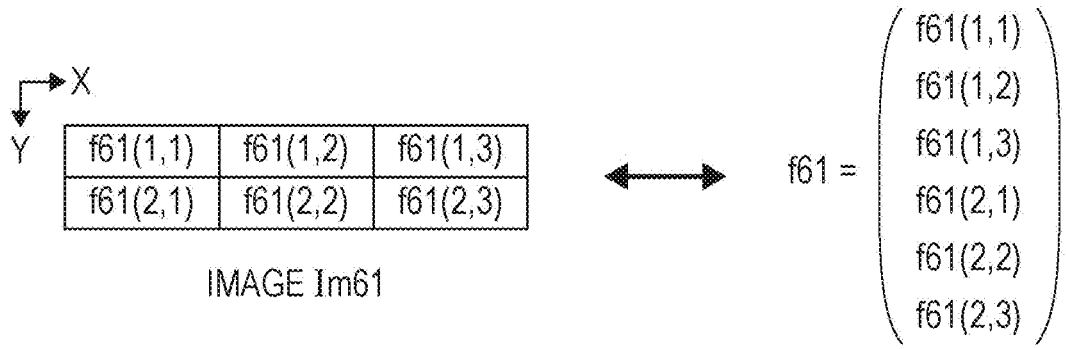
FIG. 14B illustrates an image and image data expressed in a matrix form.

FIG. 14B illustrates the image Im61 and the image data f61 expressed in a matrix form. The image Im61 includes a pixel located at coordinates (1, 1) that has a pixel value f61(1, 1) to a pixel located at coordinates (2, 3) that has a pixel value f61(2, 3). The image data f61 corresponding to the image Im61 includes pixel values f61(1, 1) to f61(2, 3).

Figure 14C:
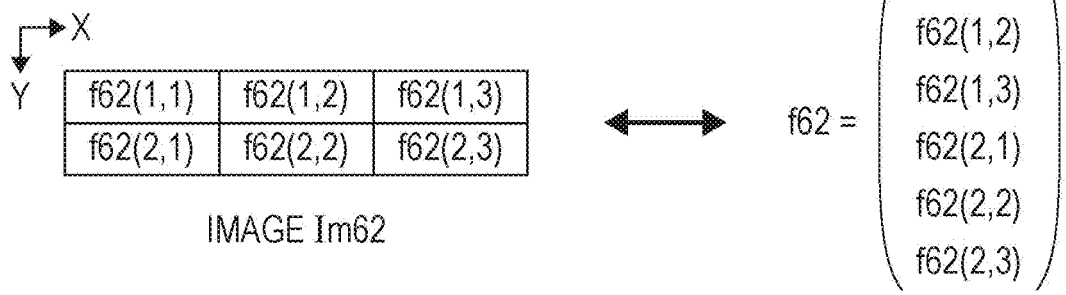
FIG. 14C illustrates an image and image data expressed in a matrix form.

FIG. 14C illustrates the image Im62 and the image data f62 expressed in a matrix form. The image Im62 includes a pixel located at coordinates (1, 1) that has a pixel value f62(1, 1) to a pixel located at coordinates (2, 3) that has a pixel value f62(2, 3). The image data f62 corresponding to the image Im62 includes pixel values f62(1, 1) to f62(2, 3).

Figure 14D:
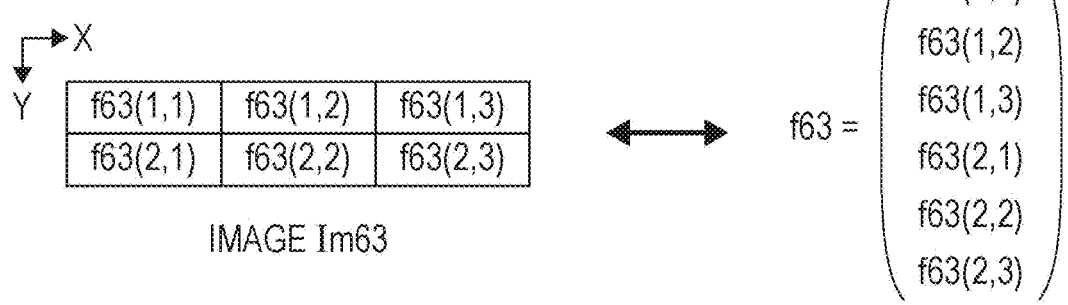
FIG. 14D illustrates an image and image data expressed in a matrix form.

FIG. 14D illustrates the image Im63 and the image data f63 expressed in a matrix form. The image Im63 includes a pixel located at coordinates (1, 1) that has a pixel value f63(1, 1) to a pixel located at coordinates (2, 3) that has a pixel value f63(2, 3). The image data f63 corresponding to the image Im63 includes pixel values f63(1, 1) to f63(2, 3).

Figure 14E:
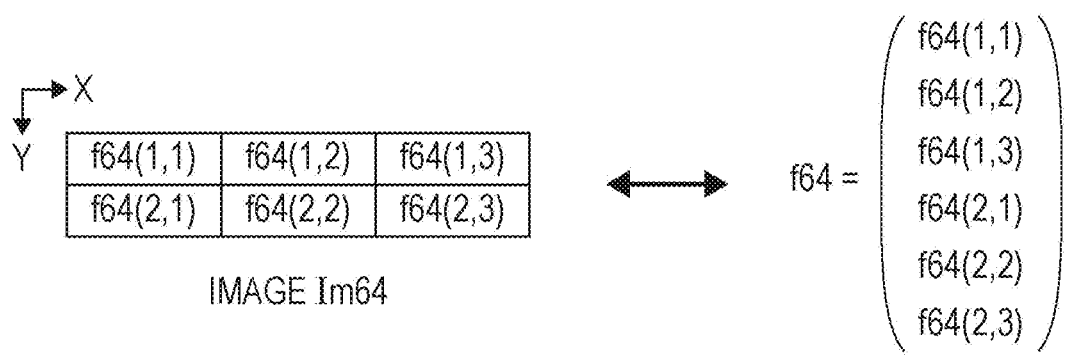
FIG. 14E illustrates an image and image data expressed in a matrix form.

FIG. 14E illustrates the image Im64 and the image data f64 expressed in a matrix form. The image Im64 includes a pixel located at coordinates (1, 1) that has a pixel value f64(1, 1) to a pixel located at coordinates (2, 3) that has a pixel value f64(2, 3). The image data f64 corresponding to the image Im64 includes pixel values f64(1, 1) to f64(2, 3).

Other Remarks 2

Various modifications of the embodiment which a person skilled in the art can think of and combinations of constituent elements in different embodiments are also encompassed within the scope of one or more aspects of the present disclosure without departing from the spirit of the present disclosure.

An imaging system according to the present disclosure is applicable to calibration of an imaging device using a compressed sensing technology.

What is claimed is:

1. An imaging system using a compressed sensing technology, comprising:
    a filter array including types of filters that are different from one another in transmission spectrum;
    an image sensor that generates image data on a basis of light that passes through the filter array;
    a processing circuit that generates hyperspectral image data including images corresponding to four or more bands included in a target wavelength region on a basis of the image data and a reconstruction table decided on a basis of a spatial distribution of the transmission spectra of the types of filters; and
    a light source that emits reference light used for calibration for correcting the reconstruction table and having a wavelength of at least one of the four or more bands,
    wherein the processing circuit corrects the reconstruction table on a basis of reference image data which the image sensor generates by detecting the reference light.

2. The imaging system according to claim 1, further comprising a storage device in which spectral data of the reference light is stored,
    wherein the processing circuit generates reference reconstructed image data on a basis of the reconstruction table and the reference image data and corrects the reconstruction table on a basis of the spectral data stored in the storage device and the reference reconstructed image data.

3. The imaging system according to claim 2, wherein the processing circuit causes the corrected reconstruction table to be stored in the storage device.

4. The imaging system according to claim 1, wherein the processing circuit causes information concerning a status of use of the imaging system before the correction to be stored in the storage device in association with the corrected reconstruction table.

5. The imaging system according to claim 1, wherein the reference light has wavelengths of at least two of the four or more bands.

6. The imaging system according to claim 1, wherein the reference light has wavelengths of all of the four or more bands.

7. The imaging system according to claim 5, wherein
the reference image data includes data of pixels; and
the data of each of the pixels includes information corresponding to the wavelengths of the two or more bands of the reference light.

8. The imaging system according to claim 1, wherein
in the calibration, the image sensor generates the reference image data by detecting the reference light a smaller number of times than the number of bands included in the target wavelength region.

9. The imaging system according to claim 1, wherein
the light source is a surface light source having a light emission surface; and
the image sensor generates the reference image data by imaging the light emission surface through the filter array.

10. The imaging system according to claim 1, wherein
the processing circuit causes a GUI by which a user gives an instruction to start the calibration to be displayed on a display device.

11. The imaging system according to claim 10, wherein
the processing circuit causes a GUI for input of information concerning a status of use of the imaging system before the calibration to be displayed on the display device.

12. The imaging system according to claim 1, wherein
the image sensor detects the reference light emitted from the light source toward a reference object and reflected by the reference object and thereby generates the reference image data.

13. The imaging system according to claim 1, wherein
the correction of the reconstruction table includes correcting an error of an element corresponding to the transmission spectrum that is included in the reconstruction table.

14. An imaging system using a compressed sensing technology, comprising:
a filter array including types of filters that are different from one another in transmission spectrum;
an image sensor that generates image data by imaging through the filter array;
a processing circuit that generates hyperspectral image data including images corresponding to four or more bands included in a target wavelength region on a basis of the image data and a reconstruction table decided on a basis of a spatial distribution of the transmission spectra of the types of filters; and
a storage device in which spectral data concerning a reference object is stored,
wherein the processing circuit corrects the reconstruction table on a basis of reference image data generated by imaging the reference object whose spectral data is stored in the storage device.

15. A method for processing data related to a compressed sensing technology that is executed by a computer, the method comprising:
acquiring reference image data generated by detecting reference light having a wavelength of at least one of four or more bands included in a target wavelength region by an image sensor that generates image data on a basis of light that passes through a filter array including types of filters that are different from one another in transmission spectrum;
acquiring a reconstruction table decided on a basis of a spatial distribution of the transmission spectra of the types of filters; and
correcting the reconstruction table on a basis of the reference image data.

16. The method according to claim 15, further comprising:
acquiring spectral data of the reference light;
generating reference reconstructed image data on a basis of the reconstruction table and the reference image data; and
correcting the reconstruction table on a basis of the spectral data and the reference reconstructed image data.

17. The method according to claim 16, further comprising causing the corrected reconstruction table to be stored in the storage device.

* * * * *